United States Patent
Itani et al.

(10) Patent No.: US 10,331,731 B2
(45) Date of Patent: Jun. 25, 2019

(54) METHOD AND APPARATUS FOR IDENTIFYING INPUT FEATURES FOR LATER RECOGNITION

(71) Applicant: Atheer, Inc., Mountain View, CA (US)

(72) Inventors: Sleiman Itani, East Palo Alto, CA (US); Allen Yang Yang, Richmond, CA (US)

(73) Assignee: Atheer, Inc., Mountain View, CA (US)

( * ) Notice: Subject to any disclaimer, the term of this patent is extended or adjusted under 35 U.S.C. 154(b) by 0 days.

(21) Appl. No.: 15/611,705

(22) Filed: Jun. 1, 2017

(65) Prior Publication Data

US 2018/0165304 A1    Jun. 14, 2018

Related U.S. Application Data

(63) Continuation of application No. 13/901,402, filed on May 23, 2013, now Pat. No. 9,747,306.

(60) Provisional application No. 61/652,129, filed on May 25, 2012.

(51) Int. Cl.
| | |
|---|---|
| *G06K 9/00* | (2006.01) |
| *G06F 16/583* | (2019.01) |
| *G06F 3/01* | (2006.01) |
| *G06F 1/16* | (2006.01) |
| *G06K 9/46* | (2006.01) |

(52) U.S. Cl.
CPC .......... *G06F 16/5838* (2019.01); *G06F 1/163* (2013.01); *G06F 3/011* (2013.01); *G06F 3/017* (2013.01); *G06F 16/5854* (2019.01); *G06K 9/0061* (2013.01); *G06K 9/00375* (2013.01); *G06K 9/4604* (2013.01); *G06T 2207/10012* (2013.01); *G06T 2207/10016* (2013.01); *G06T 2207/20112* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,943,754 B2 | 9/2005 | Aughey | |
| 8,558,759 B1 * | 10/2013 | Prada Gomez | G06F 3/017 345/156 |
| 8,686,943 B1 * | 4/2014 | Rafii | G06F 3/017 345/158 |

(Continued)

*Primary Examiner* — Shervin K Nakhjavan
(74) *Attorney, Agent, or Firm* — Mohr Intellectual Property Law Solutions, PC

(57) ABSTRACT

Disclosed are methods and apparatuses to recognize actors during normal system operation. The method includes defining actor input such as hand gestures, executing and detecting input, and identifying salient features of the actor therein. A model is defined from salient features, and a data set of salient features and/or model are retained, and may be used to identify actors for other inputs. A command such as "unlock" may be executed in response to actor input. Parameters may be applied to further define where, when, how, etc. actor input is executed, such as defining a region for a gesture. The apparatus includes a processor and sensor, the processor defining actor input, identifying salient features, defining a model therefrom, and retaining a data set. A display may also be used to show actor input, a defined region, relevant information, and/or an environment. A stylus or other non-human actor may be used.

41 Claims, 20 Drawing Sheets

(56) References Cited

U.S. PATENT DOCUMENTS

| | | | |
|---|---|---|---|
| 8,811,719 B2* | 8/2014 | Wilson | G06K 9/00355 345/419 |
| 8,994,718 B2* | 3/2015 | Latta | G06F 3/005 345/419 |
| 9,020,193 B2 | 4/2015 | Itani et al. | |
| 9,304,646 B2* | 4/2016 | Amacker | G06F 3/0481 |
| 9,324,156 B2 | 4/2016 | Itani et al. | |
| 9,772,689 B2* | 9/2017 | Hildreth | G06F 3/0304 |
| 2002/0041327 A1* | 4/2002 | Hildreth | G06F 3/011 348/42 |
| 2002/0181776 A1 | 12/2002 | Ikku et al. | |
| 2003/0086061 A1 | 5/2003 | Pfleger | |
| 2004/0193413 A1* | 9/2004 | Wilson | G06F 3/017 704/243 |
| 2005/0135701 A1 | 6/2005 | Atkins | |
| 2005/0228254 A1 | 10/2005 | Torp | |
| 2008/0013826 A1* | 1/2008 | Hillis | G06F 3/017 382/154 |
| 2008/0234583 A1 | 9/2008 | Choi et al. | |
| 2009/0027337 A1* | 1/2009 | Hildreth | G06F 3/011 345/158 |
| 2009/0315839 A1* | 12/2009 | Wilson | G06F 17/5009 345/173 |
| 2010/0238262 A1* | 9/2010 | Kurtz | H04N 7/142 348/14.01 |
| 2010/0302138 A1* | 12/2010 | Poot | G06F 3/011 345/156 |
| 2011/0054870 A1* | 3/2011 | Dariush | G06F 3/011 703/11 |
| 2011/0115892 A1 | 5/2011 | Fan et al. | |
| 2012/0035934 A1* | 2/2012 | Cunningham | G06F 1/1639 704/260 |
| 2012/0133616 A1* | 5/2012 | Nishihara | G06F 3/0325 345/175 |
| 2012/0207345 A1* | 8/2012 | Tang | G06F 3/017 382/103 |
| 2012/0212509 A1* | 8/2012 | Benko | G03B 35/00 345/633 |
| 2012/0212593 A1* | 8/2012 | Na'aman | G06K 9/00671 348/62 |
| 2012/0249741 A1* | 10/2012 | Maciocci | G06F 3/011 348/46 |
| 2012/0287284 A1* | 11/2012 | Jacobsen | G06F 1/163 348/158 |
| 2012/0309532 A1* | 12/2012 | Ambrus | G06F 3/0425 463/36 |
| 2013/0147686 A1* | 6/2013 | Clavin | G06F 3/013 345/8 |
| 2013/0147711 A1* | 6/2013 | Njolstad | G06F 3/011 345/158 |
| 2013/0176450 A1* | 7/2013 | Pryor | G06F 3/017 348/211.4 |
| 2013/0204707 A1* | 8/2013 | Ptucha | G06Q 30/02 705/14.66 |
| 2015/0054744 A1* | 2/2015 | Kurzweil | G09B 21/006 345/158 |
| 2015/0089436 A1* | 3/2015 | El Dokor | G06F 3/0233 715/773 |
| 2015/0206320 A1 | 7/2015 | Itani et al. | |

* cited by examiner

METHOD AND APPARATUS FOR IDENTIFYING INPUT FEATURES FOR LATER RECOGNITION

CROSS-REFERENCE TO RELATED APPLICATIONS

This application is a continuation application of U.S. patent application Ser. No. 13/901,402, filed May 23, 2013, which claims the benefit of U.S. Provisional Application Ser. No. 61/652,129 filed on May 25, 2012, the contents of which are incorporated by reference for all intents and purposes.

TECHNICAL FIELD

This disclosure relates to interaction with an interface. More particularly, this disclosure relates to approaches for identifying features such as image features associated with actions for interacting with the interface, under controlled conditions without disrupting workflow, so as to facilitate later recognition of those or related image features.

DESCRIPTION OF RELATED ART

Frequently, recognition of inputs and actors executing inputs, e.g. for purposes of interaction with an interface, relies at least partly upon identifying characteristic features, e.g. within an image. The characteristic features so identified can also be used to identify objects, persons, etc. in other images. Thus, a system can be in a sense "trained" to identify a particular target in an image by identifying features related to that target in images previously viewed.

However, such a training arrangement typically requires that a system be provided with one or more training images in advance of the system carrying out its intended work. This carries a cost in operating time, processing, power, etc. In addition, a system so occupied may be unable to perform normal functions for the user. Essentially, both the system and the user must devote time and effort to system training.

There is a need for an efficient method and apparatus for identifying targets such as objects, persons, etc. and/or image features associated therewith in images, without disrupting the normal operation of the system carrying out the identification.

SUMMARY

The present disclosure contemplates a variety of systems, apparatus, methods, and paradigms for interacting with an interface.

In one embodiment of the present disclosure, a method is provided that includes defining an actor input, executing the actor input, detecting the actor input, identifying at least one salient feature of the actor therefrom, and defining an actor model using the salient feature(s). The method further includes retaining a data set that includes a model of the actor and/or the salient feature(s).

The method may include defining a command to a computer system associated with the actor input, and executing the command in response to detecting the actor input.

The method may include defining limiting parameters for executing the actor input, executing the actor input within the parameters, and detecting the actor input within the parameters.

The actor may be a human vocal system, with the actor input being human speech. The actor may be a human hand, with the actor input being a hand gesture or a hand posture.

The data set may be used to identify other actor inputs.

The method may further include establishing an imaging field of view, defining a region in the field of view, and identifying the salient feature of the actor from the region in the image. Detecting the actor input may include receiving an image of the field of view with least a portion of the actor input therein.

The region may be smaller than the field of view, and substantially fully within said field of view.

The actor may be an end-effector.

The method may include identifying a plurality of salient features of the actor.

The method may include using said the data set to identify other actor inputs.

The method may include establishing first and second imaging fields of view, defining a first region in the first field of view and a second region in the second field of view corresponding to said first region, and executing the actor input in the first and second regions. The method may also include receiving at least one first image of the first field of view with at least a portion of the actor input therein, and receiving at least one second image of the second field of view with at least a portion of the actor input therein. The method may further include defining an actor model using the first and second salient features, and retaining at data set including the first salient feature(s), the second salient feature(s), and/or the model.

The method may include establishing first and second imaging fields of view, defining a region in the first field of view and in the second field of view, and executing the actor input in the region. The method may also include receiving at least one first image of the first field of view with at least a portion of the actor input therein, receiving at least one second image of the second field of view with at least a portion of the actor input therein, and identifying at least one salient feature of the actor from the region.

The first and second fields of view may form a stereo pair.

The actor input may be a substantially static posture of an end-effector, and/or a dynamic gesture of an end-effector. The end-effector may be a hand, a finger, and/or a stylus.

The method may include outputting at least a portion of the field of view to a display. The method may include outputting to the display a graphic occupying at least a portion of the region. The graphic may be a virtual object, and/or may include an unlock target. The region may be substantially shaped as the silhouette of the actor executing the input. The region may be substantially shaped as an outline of a hand executing the input. The image may include unlock instructions.

The command may be an unlock command. The command may be executed only if the data set substantially matches a reference data set.

Salient features may be edge configurations, shapes, colors, motions, and/or convex hull models.

The region may be defined as substantially two dimensional, or as three dimensional.

The method may include defining a minimum rate of apparent motion, and while identifying the salient features, ignoring portions of the region with less than the minimum rate of apparent motion. The method may include identifying salient features beginning at the bottom edge of the region. The method may include identifying salient features beginning in a horizontal stripe. The method may include determining a position of salient features in the image, obtaining a second image of the field of view, and searching for the salient features in positions in the second image that correspond to their position in the first image.

The method may include defining a preliminary data set for the actor, the preliminary data set including one or more preliminary salient features of the actor and/or a preliminary model. The method may include defining the actor input such that in executing the input, the actor exhibits preliminary salient features corresponding from the preliminary data set. Detecting the actor input then includes identifying the actor using the preliminary data set.

The preliminary salient feature may be an outline of the actor, and the preliminary model may be a shape of the actor executing the input.

The salient features may be color features of the actor, and the model may be a color characterization of the actor.

In another embodiment of the present disclosure, an apparatus is provided that includes at least one sensor and a processor in communication with the sensor. The processor is adapted to define an actor input. The sensor is adapted to detect the actor input. The processor is also adapted to identify at least one salient feature of the actor from the actor input, to define an actor model using the salient feature(s), and to retain a data set including the salient feature(s) and/or the model.

The processor may be adapted to use the data set to identify other actor inputs.

The sensor may be an image sensor, or an audio sensor.

The apparatus may further include a display in communication with the processor. The sensor may be an image sensor, with a field of view. The processor may be adapted to define a region in the field of view, the region being smaller than the field of view. The sensor may be adapted to obtain at least one image of the field of view with the actor input therein. The display may be adapted to output at least a portion of the field of view. The processor may be adapted to evaluate the actor input in the region and to identify at least one salient feature of the actor therefrom.

The apparatus may include first and second image sensors. The first and second image sensors may be disposed in a stereo configuration.

The sensor, processor, and display may be disposed on a head mounted display.

The end-effector may be a stylus. The stylus may include an indicator, the sensor being adapted to sense the indicator and the processor being adapted to identify the indicator as a salient feature.

In another embodiment of the present disclosure, a method is provided that includes establishing an imaging field of view, defining a region in the field of view with a shape substantially corresponding to a human hand, defining a preliminary data set for the hand including preliminary outline salient features of the hand and/or a preliminary outline model of the hand, and defining the input so be a hand posture/gesture that exhibits the preliminary salient features. The method may include outputting the field of view to a display, and outputting a virtual object in the shape of a human hand occupying some or all of the region. The method may include executing the input in the region, executing an unlock command in response to the input, and identifying the actor using the preliminary data set. The method may include identifying salient color features of the hand from the input and defining a color characterization model of the hand using the salient color features, retaining a data set including the salient color features and/or the color characterization model, and identifying the hand in other images using the data set.

In another embodiment of the present disclosure, an apparatus is provided that includes a body adapted to be worn on a user's head. At least one image sensor is disposed on the body, the image sensor having a field of view. A processor in communication with the sensor is disposed on the body. A display in communication with the processor is disposed on the body such that the display is disposed in front of and proximate to at least one of the user's eyes when the body is worn on the user's head. The processor is adapted to define a region in the field of view. The processor is also adapted to define a visible input with a hand, the visible input being a hand gesture or a hand posture. The image sensor is adapted to obtain at least one image of the field of view with the input therein. The display is adapted to output at least a portion of the field of view, and to output a virtual object occupying at least a portion of the region. The processor is further adapted to identify salient features of the hand from the region in the image. The processor is further adapted to define an actor model using the salient features, to retain a data set including the salient features and/or the model, and to identify the hand in other images using the data set.

In another embodiment of the present disclosure, an apparatus is provided that includes means for establishing an imaging field of view, means for defining a region in the field of view, means for defining an end-effector input, means for obtaining at least one image of the field of view with the input therein, means for evaluating the region in the image and identifying at least one salient feature of the end-effector therefrom, means for defining an end-effector model using the salient features, and means for retaining a data set including the salient features and/or the model.

BRIEF DESCRIPTION OF THE SEVERAL VIEWS OF THE DRAWINGS

Like reference numbers generally indicate corresponding elements in the figures.

DETAILED DESCRIPTION OF THE DISCLOSURE

Figure 1:
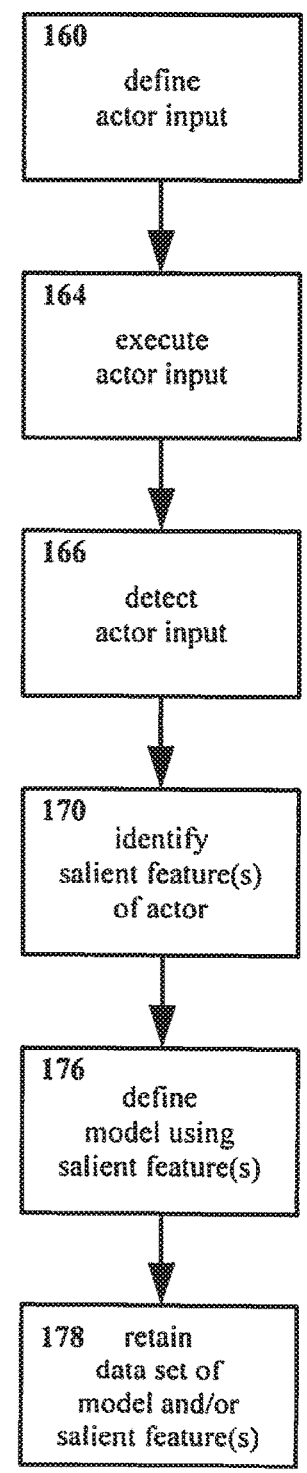
FIG. 1 shows an example embodiment of a method for interacting with an interface in accordance with the present disclosure.

Referring to FIG. 1, a method of manipulating and/or interacting with an interface is shown therein. More particularly, the example method as shown in FIG. 1 facilitates efficient identification of an end-effector or other target for manipulating an interface, e.g. a three dimensional visual interface, without interrupting the normal operation of the system generating the interface.

The term "user interface" as used herein is a space or environment (whether physical, virtual, or other) wherein a user interacts with some system. Interfaces are frequently used to interact with computers and other control and information systems, but interfaces are not necessarily limited thereto.

For purposes of explanation, interfaces are at times described herein using language referring to visual and/or three dimensional interfaces. Such interfaces include, but are not limited to, virtual reality and augmented reality interfaces. However, the present disclosure is not limited only to use with three dimensional interfaces, nor is the present disclosure limited only to use with visual interfaces. Other arrangements may be equally suitable.

In the method as shown in FIG. 1, an actor input is defined 160. In defining an actor input 160, typically an actor is specified, and an input with that actor is specified.

As used herein, the term "actor" encompasses any element or system that may apply an input to the present disclosure. The term "input" is similarly broad, and encompasses any data-carrying signal issued by an actor.

The range of possible actors and inputs is extremely broad, and will depend to at least some extent on the particulars of a given embodiment. For example, for an embodiment of the present disclosure engaged with a visual three dimensional display, suitable actors might include end-effectors, e.g. a fingertip, a hand, a stylus, a light beam, etc. In such an embodiment, a user might utilize their finger (or other end-effector or actor) to send inputs, e.g. as detected by cameras or other imaging sensors, with those inputs thus having the form of gestures, postures, touching or otherwise manipulating virtual objects, etc.

However, the present disclosure is not limited only to end-effectors as actors, nor to visual environments or visually detected inputs. A wide range of potential actors may be suitable for use with embodiments of the present disclosure. For example, a user's eyes might be usable as actors, with inputs that might include looking at particular objects or points in space, moving the eyes in a particular fashion, etc., with the user potentially manipulating an interface thereby.

Further, although visual sensors could be used for detecting eye motion, other arrangements such as electrooculography and/or magnetooculography might be used in addition to or instead of visual sensing. (Human eyes act as electrical dipoles; electrooculography and magnetooculography monitor electrical and/or magnetic properties of a user's eyes, enabling determination of the direction in which the eye is pointing, i.e. where the person is looking, and/or detection of motion of the eye.)

Likewise, a human vocal apparatus may serve as an actor, e.g. with vocalizations serving input. A human face could serve as an actor, with facial expressions serving as input. A human brain could serve directly as an actor, with brainwaves and/or brain activity (e.g. as measured through electroencephalography, magnetoencephalography, functional MRI, etc.) serving as input. Non-human physical objects, such as keyboards, mice, styluses, etc. may also be actors, with manipulations thereof (e.g. text input, mouse clicks, stylus manipulation, etc.) serving as input. Other arrangements may also be equally suitable, and the present disclosure is not particularly limited with regard to actors and/or inputs.

In addition, a given embodiment of the present disclosure is not necessarily limited only to one type of actor (alone or in combination), and/or to only one type of input. For example, a single embodiment might support the use of multiple different end-effectors, e.g. a finger, a hand, and a stylus. Similarly, such an embodiment may support inputs suited to each such end-effector. Other multi-actor arrangements also may be suitable, such as an embodiment that accepts inputs both from a human vocal apparatus and from a human hand.

With regard to FIG. 1, the step of defining actor input 160 may therefore include definition of multiple possible actors, and/or multiple possible inputs.

The method shown in FIG. 1 also includes executing the actor input 164. That is, one or more of the inputs defined in step 160 for the actor(s) defined in step 160 are delivered. For example, for an embodiment wherein the actor input is defined 160 as a gesture (input) with a human hand (actor), in step 164 that hand gesture is performed.

The actor input is also detected 166. As noted above, the manner by which the actor input is detected 166 is to some degree a function of the particulars of the actor and/or the input. Thus, image sensing (for example with one or more cameras) might be utilized to detect a hand gesture, audio sensing (for example using a microphone) might be utilized to detect a human vocalization, etc. A wide range of sensing techniques and sensors are potentially suitable, and the present disclosure is not particularly limited with regard to how inputs may be sensed, or to the sensors that may be utilized.

Once the actor input is detected, at least one salient feature of the actor is identified therein 170.

As the term is utilized herein, a "salient feature" of an actor is a feature of that actor that exists in a substantially consistent fashion. Salient features may include, but are not limited to, structural features such as end points, edges, and joints, coloring or other surface features such as texture, reflectiveness, and so forth, geometries such as convexities and concavities, etc.

As an example, considering a visual image of an end-effector such as a human hand, salient features might include visual features of the hand that exist independently of perspective, and that therefore can be sensed and identified in different images of the actor, possibly even with different sensors (i.e. two different cameras, two different sensing techniques, etc.), and potentially from different perspectives. For example, salient features may be or be derived from the geometry of the hand in question, such as fingertips, joints, etc.

Although salient features as defined herein are substantially consistent in terms of continuing to exist and being visible from differing perspectives, it is noted that salient features are not necessarily fixed or constant. For example, for an hand used as an actor, the tips of the fingers may move, joints may bend or pivot, etc. However, the overall number of fingers (and thus of fingertips), the general structural arrangement of joints, etc. is substantially consistent under normal circumstances (i.e. unless the hand is damaged). Likewise, although a finger typically may be seen to have a visible edge or outline, precisely what portion of that finger may represent the edge or outline may be a function of the orientation of the hand and finger, and the perspective of the view. That is, rotating a finger may make a different portion of the surface of that finger visible and characterizeable as the edge or outline of the finger, but the finger as viewed still will have an edge/outline.

As noted, salient features may for example include geometric features of the actor, such as end points at the tips of end-effectors such as fingers, joints or pivot points, edges, or other structural geometric features. In addition, more complex or abstract geometric features, such as ratios of dimensions, convex or concave hull features, and so forth may also serve as salient features.

Salient features may also include color features, such as color values at a single pixel, a group of pixels, a gradient or other collective pixel feature, etc. Color categorization for salient features is not particularly limited, and may for example utilize values in RGB, YUV, and/or other systems.

However, these are examples only, and other features may also be equally suitable for use and identification as salient features. In particular, salient features not related to visual imaging may also be suitable for certain embodiments.

Note that it may not be required that a feature be visible in every possible field of view or from every possible perspective in order to be considered a salient feature. For example, since a hand is a solid object, a particular salient feature on one side of the hand may not be visible in images taken from perspectives on the opposite side of that hand, even though that feature may continue to exist. More concretely, a finger may exist consistently while being invisible from some perspectives. Salient features are not necessarily always visible (or detectable, for non-visual sensing), rather, salient features are features that exist substantially consistently, and that are identifiable with high reliability and repeatability when those features are visible.

In addition, it is emphasized that salient features are not necessarily directly visible in themselves. A salient feature may take the form of a mathematical construct, pattern, function, expression, vector, etc. as derived from an image or other input, rather than the image itself or a portion of the image. Thus, salient features will not necessarily be clearly visible, or even subject to capture as visual features at all even for embodiments using visual imaging as source data, nor will salient features as identified and considered by the present disclosure necessarily be illustratable in a fashion as to be comprehensible or even necessarily detectable by human vision.

As noted, the present disclosure is not limited only to visual sensing, or to actors and/or inputs that may be sensed visually. Similarly, salient features need not necessarily be visual features. For example, for vocalizations salient features may include (but are not limited to) characteristic patterns in sound waves, pronunciation and/or speech patterns. For direct brain control, salient features might include (but are not limited to) characteristic brainwave signatures and/or neural activity patterns. Other salient features may also be equally suitable.

In addition, the present disclosure is not limited with regard to the manner by which salient features are identified or extracted from the source data (i.e. images, audio, etc.) A wide range of approaches for identifying salient features are potentially possible, depending at least in part on the actors and inputs for a given embodiment. For example, for image-based embodiments approaches may include but are not limited to SIFT (Scale-Invariant Feature Transform), SURF (Speeded Up Robust Feature), and ORB (Oriented FAST and Rotated BRIEF). However, these are examples only, and other arrangements may be equally suitable.

Returning to FIG. 1, a model of the actor is defined 176 using the salient features identified in step 170. The nature of the model will depend to at least some degree on the nature of the salient features. That is, collection of salient features that define or characterize the color of the actor would support definition of a color model of the actor therefrom. Likewise, salient features regarding actor outline might support definition of a model of the outline of the actor, the silhouette of the actor, overall 2D or 3D geometry of the actor, etc. Other types of salient feature and/or model may also be suitable.

It is noted that the term "model" as used herein does not necessarily imply a visual construct, though visual constructs also are not excluded. Rather, a model is an informational construct that represents an actor. For example, a model might be defined with sufficient accuracy and/or fidelity so as to permit a determination of whether salient features detected subsequently match with the model, and thus may be considered to be associated with the actor in question. A model might also be defined so as to enable prediction or simulation of salient features for a particular actor executing a particular input.

The present disclosure is not particularly limited insofar as the content of models. Models may be and/or include visual constructs, may be mathematical algorithms, probability functions, databases, etc. For example, a color model might include a visual model of the surface coloration of an actor such as a user's hand, but might in addition or instead include information regarding average coloring, a database mapping color as distributed over the surface of the hand, mathematical functions describing the degree and/or patterns of variation in the hand's color, etc.

Again referring to FIG. 1, a data set is retained 178. The data set may include some or all of the salient features as identified in step 170, and/or may include the model defined in step 176.

The present disclosure is not limited with regard to the manner by which the data set is retained. Salient features (and/or images from which those salient features were identified) and/or a model may for example be stored in electronic memory, but other arrangements may be equally suitable. It is noted that the data set is not required to be stored for an unlimited period; rather, as described with regard to further examples described below, the data set may be useful in performing additional functions, and need be retained only long enough to facilitate such functions (though data sets also are not required to be discarded at any particular time, and may be retained indefinitely). Potential additional steps performed with the data set retained 178 are described below with regard to other example methods.

It will be understood that, when followed, the method of FIG. 1 provides a basic arrangement for gathering a data set with salient features regarding and/or a model of a particular actor. That is, a user performs a defined input with a defined actor, that actor and input are sensed, and a data set for that actor is defined. The data set is then stored, making the salient features and/or model available for further use.

Figure 2:
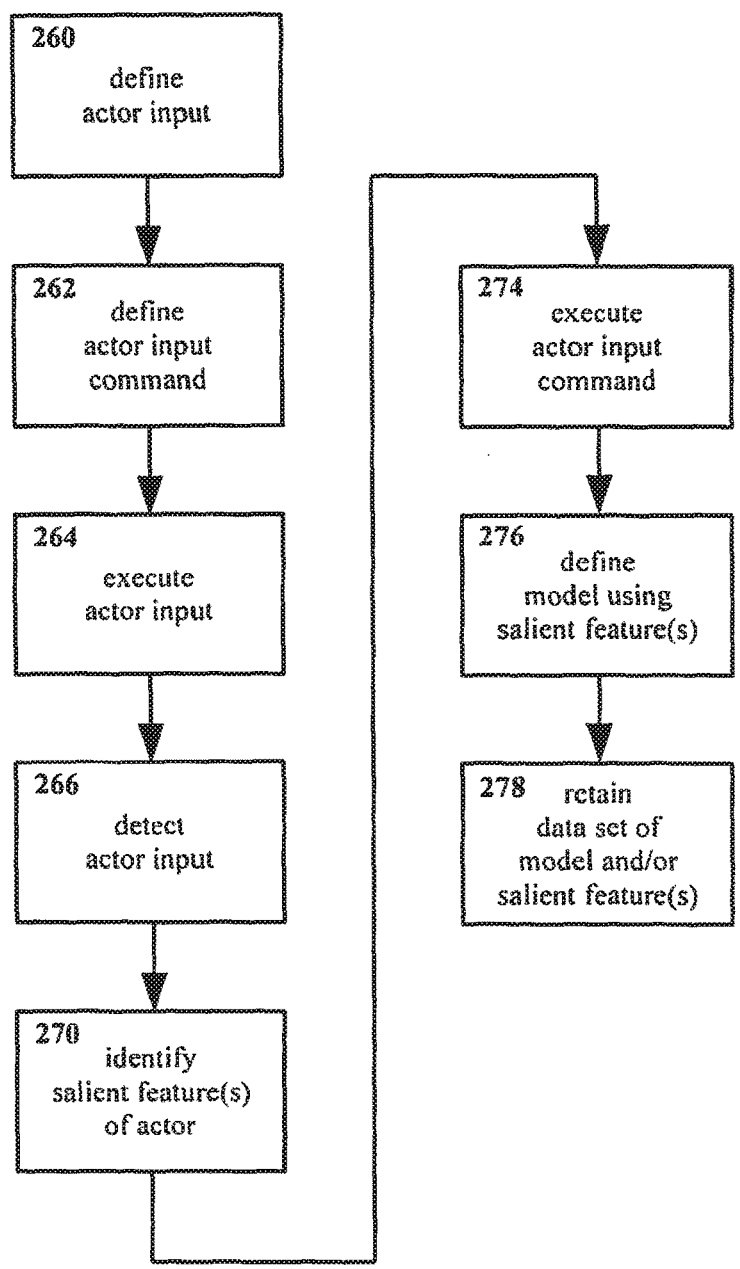
FIG. 2 shows another example embodiment of a method for interacting with an interface in accordance with the present disclosure, including execution of an actor input command.

Moving on to FIG. 2, therein another method is shown for manipulating an interface. The method of FIG. 2 is similar to the method of FIG. 1, however, in the method as shown in FIG. 2 a command is associated with an actor input.

In the method as shown, an actor input is defined 260.

In addition, an actor input command is defined 262. That is, one or more commands are defined for some system associated with and/or in communication with the interface in question. In defining the actor input command 262, that command is associated with the actor input such that (as described below) when the actor input is detected the command will be executed by the relevant system.

Typically, though not necessarily, the system for which the command is defined 262 will be a computer, computer network, and/or other data processing and storage system.

The present disclosure is not particularly limited with regard to what command or commands may be defined 262 so as to be associated with the actor input. More discussion regarding commands follows below, with regard to the method shown in FIG. 2.

Regardless of the particulars of the system and command, the actor input is executed 264, and the actor input is detected 266. One or more salient features of the actor are identified 270.

In addition, the command that was defined to be associated with the actor input in step 262 is executed as step 274. It is noted that the order of the execution of the command 274 with respect to other steps of the method is not necessarily limited to the ordering as shown in FIG. 2. For example, the command might be executed 274 later, or might be executed earlier provided the actor can be reliably determined to have executed the input 266.

Returning to FIG. 2, a model of the actor is defined 276 using the salient features identified in step 270. A data set is retained 278, including one or more of the salient features identified in step 270 and/or the model defined in step 276.

As noted above, the present disclosure is not particularly limited with regard to what command or commands may be defined 262 so as to be associated with the actor input. However, for certain embodiments it may be desirable to associate a particular actor input 262 with a command that unlocks, activates, wakes, or otherwise initiates the system with which the user is interfacing, and/or prepares that system to receive and execute additional commands. In such instances, in executing the method as shown in FIG. 2, the same user action that activates the device—namely, executing the actor input—also provides an opportunity for the system to identify salient features in the actor.

More particularly, such an arrangement of characterizing the actor as part of an unlocking process provides an opportunity for a system to characterize an actor under relatively controlled conditions. As noted, the input that is to be delivered, and/or the actor that is to deliver that input, are defined in step 260. Thus, the actor—the hand, stylus, etc. that is to deliver the input—and the input itself is known. Absent such knowledge, the range of potential actors and inputs, and the range of potential associated salient features thereof, is very large. Using a method such as that shown in FIG. 2, wherein it is known in advance that a particular actor will execute a particular input, the work of characterizing the actor in terms of identifying salient features becomes simpler.

Even in an embodiment wherein multiple actors and/or multiple inputs may be accepted, as described earlier, the process of identifying salient features in an actor is simplified if the actors are known to be members of a defined group. That is, it may not be known in advance whether an actor will be a finger or a stylus, but knowing that the actor will be one or the other greatly reduces the option space that must be considered in characterizing the actor. Likewise, if an actor is not known with precision, but some information regarding the actor is known, the process of identifying salient features may also be simplified. For example, if the specific hand that will serve as actor is not known, but it is known that the actor will indeed be a human hand, certain assumptions may be made based on the known structure of human hands generally in order to make identifying salient features simpler, more reliable, etc.

In addition, use of the method shown in FIG. 2 allows for definition of the input in a fashion that considers the difficulty in identifying salient features. That is, an input may be defined that makes identifying salient features is simple, reliable, etc. based on the strengths and weaknesses of particular sensors, algorithms, etc. Conversely, if the input is known at the design stage, sensors, algorithms, etc. for a particular apparatus may be selected based on the ability of such components to support identification of the salient features of a particular actor and/or input.

Furthermore, it is noted that by combining an unlock or similar command with identification of salient features of an actor, the user's experience of interacting with the system is not interrupted. Rather than having a separate training process for identifying salient features, the user's activation command itself provides an opportunity for identifying salient features.

Figure 3:
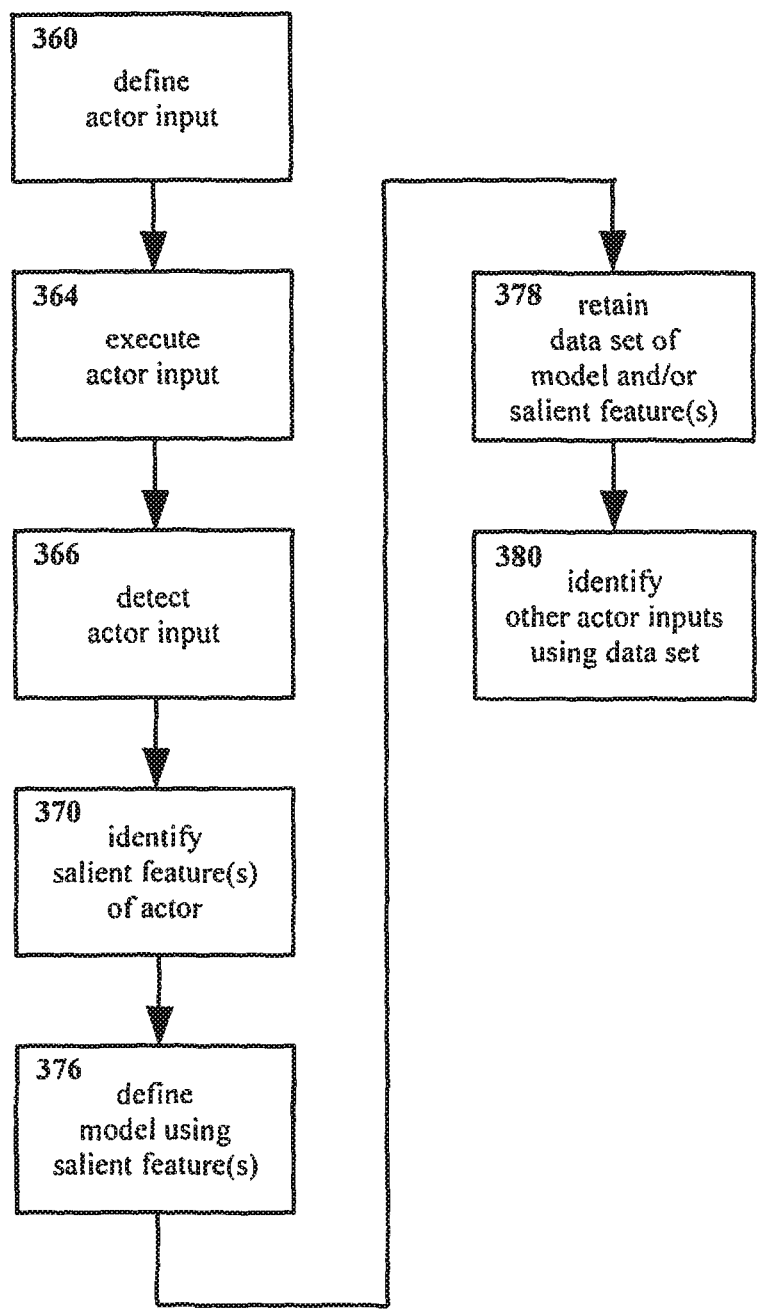
FIG. 3 shows another example embodiment of a method for interacting with an interface in accordance with the present disclosure, including identification of other actor inputs.

Continuing now with FIG. 3, therein another method is shown for manipulating an interface. The method of FIG. 3 is similar to the method of FIG. 1 and FIG. 2, however, in the method as shown in FIG. 3, the identified salient feature(s) of the actor are further utilized.

In the method as shown, an actor input is defined 360. The actor input is executed 364, and the actor input is detected 366. One or more salient features of the actor are identified 370. A model of the actor is defined 376 using the salient features identified in step 370. A data set is retained 378, including one or more of the salient features identified in step 370 and/or the model defined in step 376.

In addition, at some point, the data set retained in step 378 is used to identify other actor inputs 380.

For example, if the same actor is used to send other inputs, the data set retained in step 378 can be used to identify that actor again, e.g. so as to detect and identify inputs being given using that actor. As a more concrete example, for an arrangement wherein a hand is used as an actor and a posture or gesture is used as an input, having identified salient features of a hand gesture/posture (actor input) in step 370 and having defined a model of the hand in step 376, the salient features and/or model may be used to identify other hand gestures/postures (actor inputs) 380.

It is not required that step 380 necessarily take place in real time. For example, if the actor appears in stored data (whether taken previously or otherwise), the data set may be used to identify the actor therein, as well. For example, if the actor is a hand, the input is a gesture, and the input is sensed using a camera or other image sensor, then the data set retained in step 378 may be used to identify the actor in other images, whether or not those images are obtained at the same time, using the same equipment, etc. Similarly, other sorts of actors may be so identified, e.g. voices in audio recordings, faces in images, etc.

Figure 4:
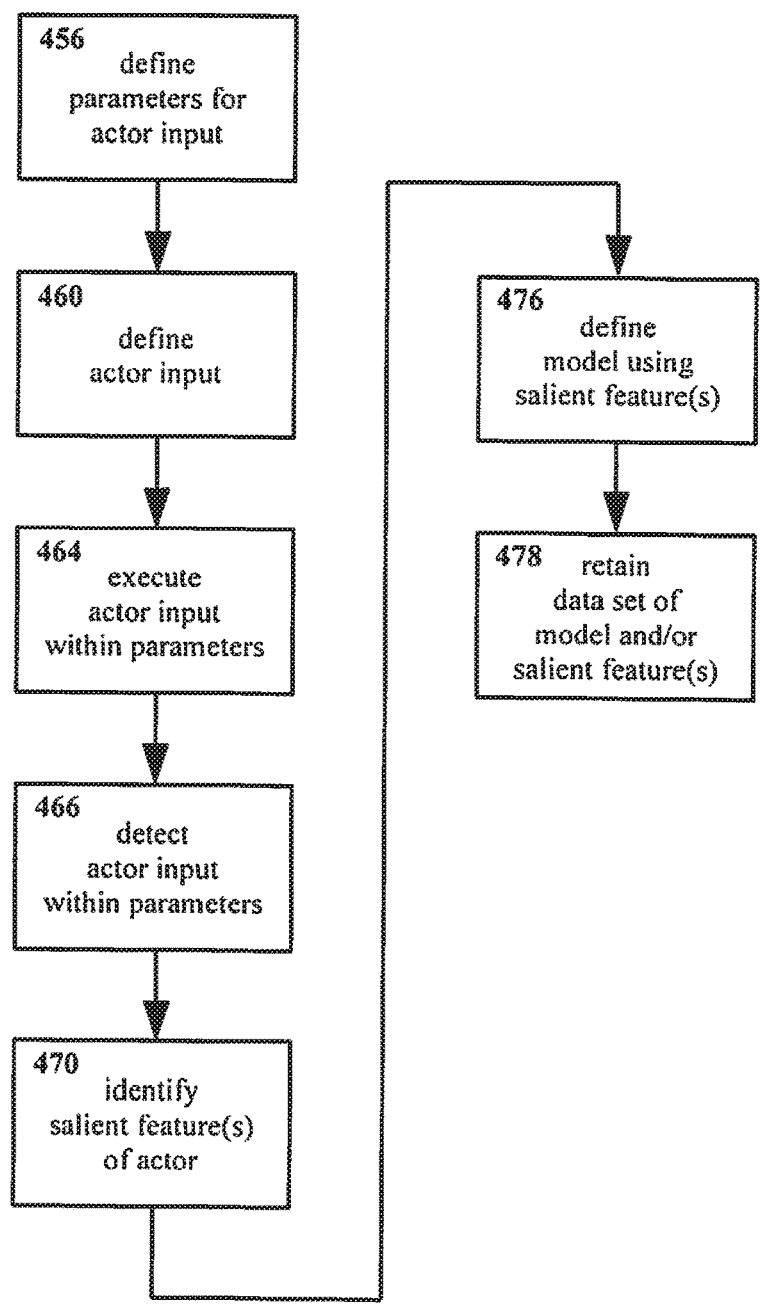
FIG. 4 shows another example embodiment of a method for interacting with an interface in accordance with the present disclosure, including defining parameters for actor input.

Turning to FIG. 4, therein another method is shown for manipulating an interface. The method of FIG. 4 is similar to the method of FIG. 1 through FIG. 3, however, in the method as shown in FIG. 4 the parameters defining the actor input are further specified.

In the method as shown, environmental parameters for actor input are defined 456. The environmental parameters may vary considerably from one embodiment to another, but generally the environmental parameters serve to further specify variables such as where the actor input will take place, when the actor input will take place, how the actor input will be executed (e.g. speed of motion for a gesture), etc. Other environmental parameters may also be equally suitable.

For example, for a case wherein the actor is a hand and the input is a gesture, environmental parameters may be defined 456 such that the gesture must be made at a certain position, within a certain range of distances from a sensor, at a certain time, with a minimum and/or a maximum speed of motion, with pauses between individual motions, etc.

Continuing with the method of FIG. 4, actor input is defined 460. The actor input is executed 464, within the parameters defined in step 456. For example, if parameters are defined 456 such that actor input is to be performed within a certain range of elevations, headings, and distances relative to a user or a sensor, then the actor input is executed within that range of elevations, headings, and distances.

It is noted that, although as shown in FIG. 4 environmental parameters are defined 456 before actor input is defined 460, this is an example only. Other arrangements, for example wherein actor input is defined 460 before environmental parameters are defined 456, may be equally suitable. Furthermore, in general unless otherwise noted herein or logically precluded, the order of steps within methods according to the present disclosure may vary. For example with regard to FIG. 4, certain steps such as steps 456 and 460 (and similar steps in other embodiments) may be reordered where logic permits and such arrangement would not violate the described function of the present disclosure.

Returning to FIG. 4, the actor input is detected 466 within the parameters specified in step 456. To continue the preceding example, detection efforts for the actor input would focus on, and perhaps (though not necessarily) be limited to, the specified range of elevations, headings, and distances.

As has been previously described with regard to the method shown in FIG. 2, defining an actor and/or an input to be executed by the actor, and then focusing detection efforts to detect that specific actor and input, may simplify identifying salient features of the actor so as to characterize and/or identify the actor and/or the input. Similarly, for the arrangement shown in FIG. 4 defining environmental parameters 456, executing the actor input within those parameters 464, and focusing detection efforts based on those parameters 466, may also simplify identifying salient features of the actor.

That is, by defining where, when, how, etc. an actor is to apply an input, it becomes possible to focus efforts for sensing the actor and evaluating the input on the appropriate place, time, and so forth. Less effort may be applied to monitoring times, areas, etc. beyond the defined parameters.

For example, given an arrangement wherein the actor and input are to be detected using images, and the parameters are defined so as to specify a region in space, then it is only necessary to image that region, and/or to process a portion of image data representing that region. This can potentially reduce the total area that must be imaged, and/or reduce the amount of image data that must be processed, by a large factor.

It is noted that defining image parameters does not necessarily preclude sensing and/or evaluation outside of the specified parameters. That is, it may not be prohibited to image areas outside a defined input region, or to evaluate/process data obtained from areas outside the defined input region. However, by defining parameters so as to specify a particular place, time, etc. for the actor input, imaging and/or evaluation for areas outside the input region is not required.

In particular, it is noted that an actor input may be initiated within a region, after which the input may proceed beyond the region. For example, for a hand used as an actor and a gesture used as an input, a gesture may begin in the region, and continue beyond the region. Likewise, additional gestures and/or postures might be executed outside the region (which might for example be identified using the salient features retained in step 478, below).

Continuing with the method shown in FIG. 4, one or more salient features are identified for the actor 470 based on the actor input, as detected in step 466. A model is defined 476 using salient features identified in step 470. A data set of salient features and/or model is then retained 478.

Figure 5:
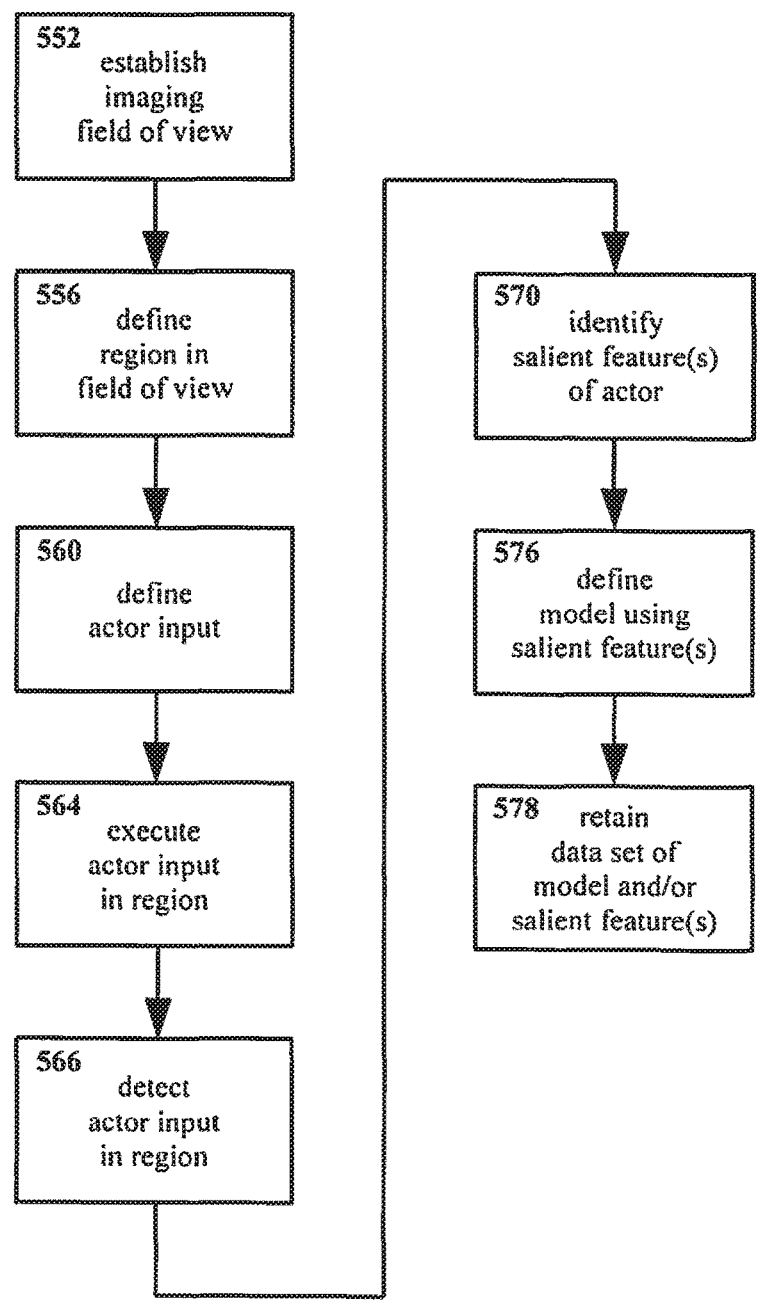
FIG. 5 shows another example embodiment of a method for interacting with an interface in accordance with the present disclosure, using a visual environment.

Turning to FIG. 5, therein another method is shown for manipulating an interface. While the methods shown in FIG. 1 through FIG. 4 are broad and general with regard to matters of sensing, the method of FIG. 5 provides a more concrete example using visual imaging. This is done for clarity, but the present disclosure is not limited only to visual imaging, and other arrangements may be equally suitable.

In the method of FIG. 5, an imaging field of view is established 552. The imaging field of view may, for example, be the full optical field of view of a camera or other image sensor. However, the imaging field of view is not particularly limited with regard to size, etc. Additionally, the imaging field of view may be defined other than by the physical parameters of a sensor, e.g. the imaging field of view under consideration may be a portion of an optical field of view of a camera, a combination of some or all of the optical fields of view of multiple cameras, etc.

A region is defined 556 within the field of view. That is, some portion of the field of view is selected, based for example on one or more parameters, e.g. a range of headings, elevations, and distances. The region typically is, but is not necessarily required to be, smaller than and fully encompassed by the imaging field of view. In addition, the region typically is, but is not necessarily required to be, defined to be of a dimension so as to conveniently accommodate the actor as the actor executes an input.

An actor input is defined 560. For purposes of the method of FIG. 5, wherein detection is accomplished through imaging, the actor and the input are required to be visible using an image sensor, such as a camera. For example, the actor may be defined to be a user's hand, and the input may likewise be defined to be a posture and/or gesture implemented with the user's hand. However, this is an example only, and other embodiments may use non-visible actors and/or inputs.

The actor input is executed 564, in such a position that the actor input is visible within the region defined in step 556. At least one image that includes the region is received 566. For example, the image might be obtained by a camera, the camera then transmitting it so that the image is received by a processor. However, the image might also be received from stored memory, from a network, or from some other source.

One or more salient features are identified for the actor 570, using the image(s) obtained in step 566. Although as noted at least one image is required, multiple images may be received, and/or multiple images may be evaluated so as to identify one or more salient features.

A model is defined 576 using the salient feature(s) identified in step 570. A data set including one or more of the salient features identified in step 570 and/or the model defined in step 576 is then retained 578.

Referring collectively to FIG. 6 through FIG. 10, visual examples are provided to illustrate the functionality of one possible embodiment of the present disclosure for interacting with an interface. The example interface shown therein is visually based, and uses an end-effector in the form of a human hand as an actor, and inputs in the form of hand gestures and/or hand postures. Such a visually oriented embodiment is presented so as to be readily illustrated and understood. However, it is emphasized that this is an example only, and that other arrangements may be equally suitable.

Figure 6:
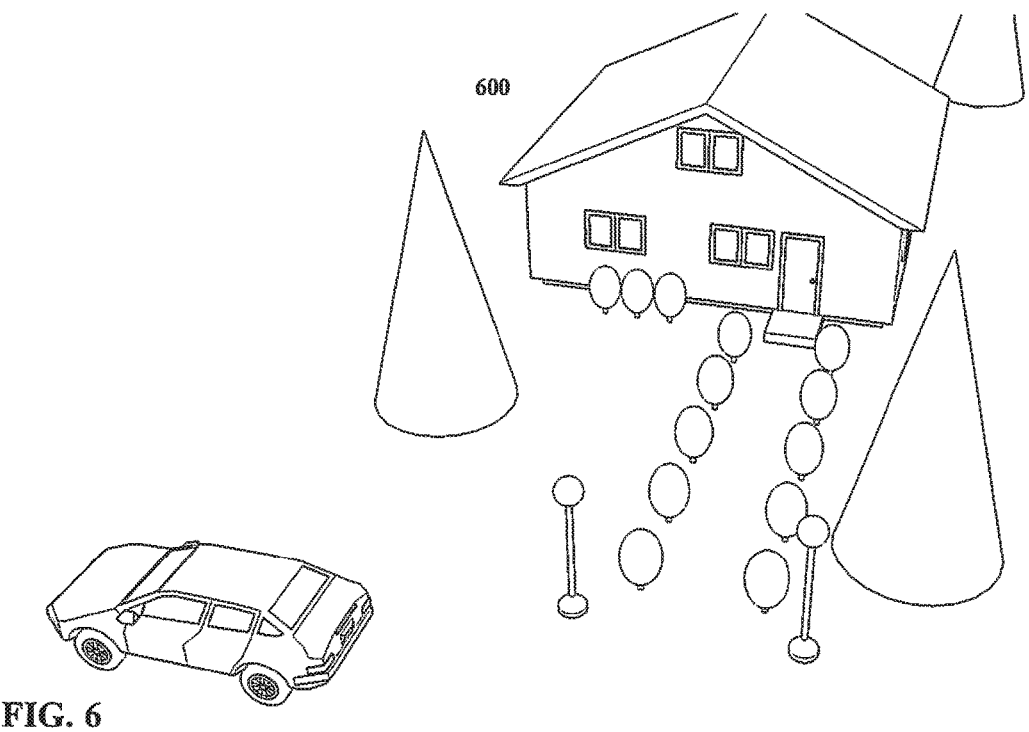
FIG. 6 shows a three dimensional environment.

With regard specifically to FIG. 6, a perspective view of an example of a visible, three dimensional environment 600 is shown therein. It is emphasized that the environment 600 itself is not necessarily part of the present disclosure, rather, the example of the present disclosure as shown is useful within a visible three dimensional environment. Also, the present disclosure in general is not necessarily useful exclusively within a visible three dimensional environment.

FIG. 6 is provided for clarity, so as to provide a highly visible illustration of an environment 600 used as an example herein for purposes of describing the present disclosure.

The three dimensional environment 600 shown in FIG. 6 may be real physical environment. However, the present disclosure is not limited to real environments. The environment 600 shown in FIG. 6 may be a virtual environment, wherein the objects and/or other content therein is for example computer generated and outputted to a display. Alternatively, the environment 600 shown in FIG. 6 may be an augmented reality environment, wherein some content is physical or real-world content while other content is virtual. Other arrangements may also be equally suitable.

As may be seen from FIG. 6, the example three dimensional environment 600 includes a number of objects therein, such as an automobile, lamp posts, trees, a building, and shrubs. As stated, these objects are not necessarily part of the present disclosure; the objects in the environment 600 are not individually numbered or referenced, and (as noted generally with regard to the environment as a whole) are not necessarily part of the present disclosure, but are shown herein as a background environment for illustration of an example of the present disclosure.

Figure 7:
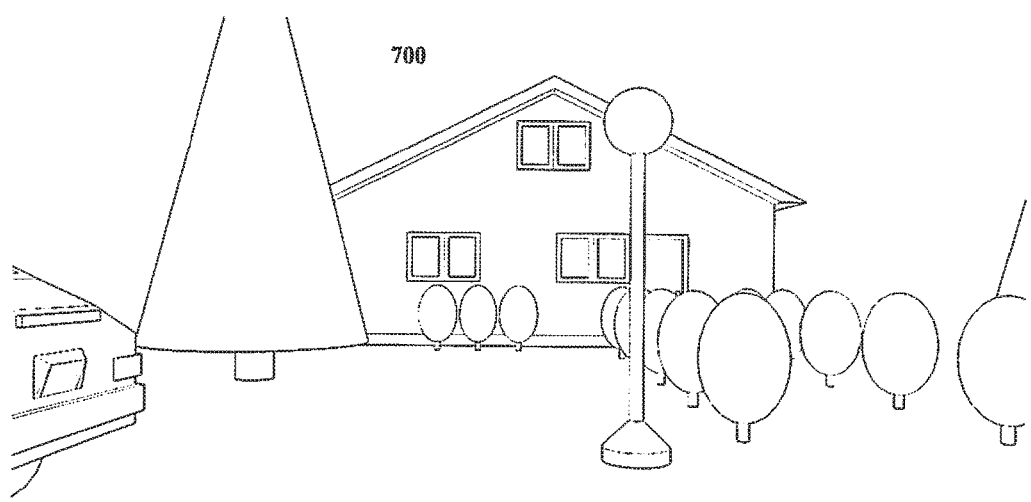
FIG. 7 shows a field of view of a three dimensional environment.

Turning to FIG. 7, shown therein is a field of view of a three dimensional environment 700 similar to that shown in FIG. 6, as from an example point in or near to the central bottom edge of the environment as illustrated in FIG. 6. The field of view as shown in FIG. 7 is such as might be obtained by a human eye or an imaging device at approximately eye level, located at or near an edge of the three dimensional environment 700 and facing inward thereto. Under such circumstances, the field of view as shown in FIG. 7 may be considered to be an example of an imaging field of view.

Although FIG. 7 shows only a single point of view, the discussion herein is not limited only to one particular point in an environment, and the present disclosure is not particularly limited with regard to a particular location or locations within or near a three dimensional environment or other environment.

Moving on to FIGS. 8A through 8D, a field of view of an environment similar to that in FIG. 7 is shown therein, with a sequence of events corresponding with an actor executing an input, as described below.

Figure 8A:
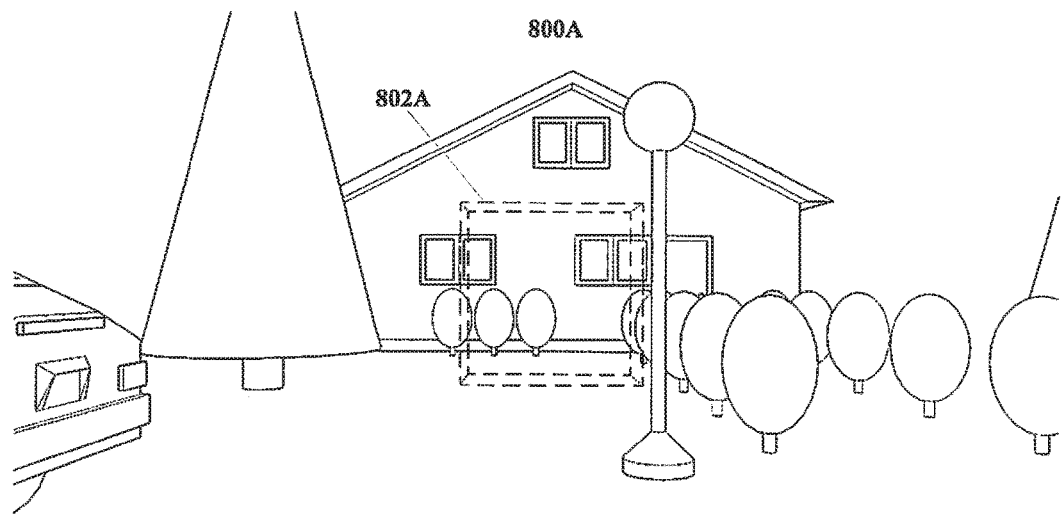
FIG. 8A through FIG. 8D show a region in accordance with the present disclosure, and an actor executing input therein.

In FIG. 8A, a field of view of an environment 800A similar to that in FIG. 7 is shown therein. In addition, FIG. 8A also shows a three dimensional region 802A defined within the field of view. The region 802A is a defined space; the region 802A does not necessarily have any substance, nor is the region 802A necessarily visible, though substance and/or visibility are not excluded. Rather, the region 802A is a zone in space, having specified dimensions and a specified location.

The region 802A may be a virtual or augmented reality object, defined into some position in real or virtual space. For example, if visible, the region 802A may be overlaid over a real environment onto a transparent display, or generated as part of an entirely virtual environment. Thus, even when nominally visible, the region 802A may be visible only to persons using or with access to a display capable of showing augmented and/or virtual objects. Other arrangements may be equally suitable.

As shown, the region 802A is a three dimensional rectilinear volume, however this is an example only. Other shapes may be equally suitable, including but not limited to shapes that are not three-dimensional. In addition, although as illustrated the region 802A is defined at a three dimensional position, this also is an example only, and other arrangements, including but not limited to a region 802A with a location defined in only two dimensions (e.g. heading and elevation but not distance) may also be equally suitable.

Figure 8B:
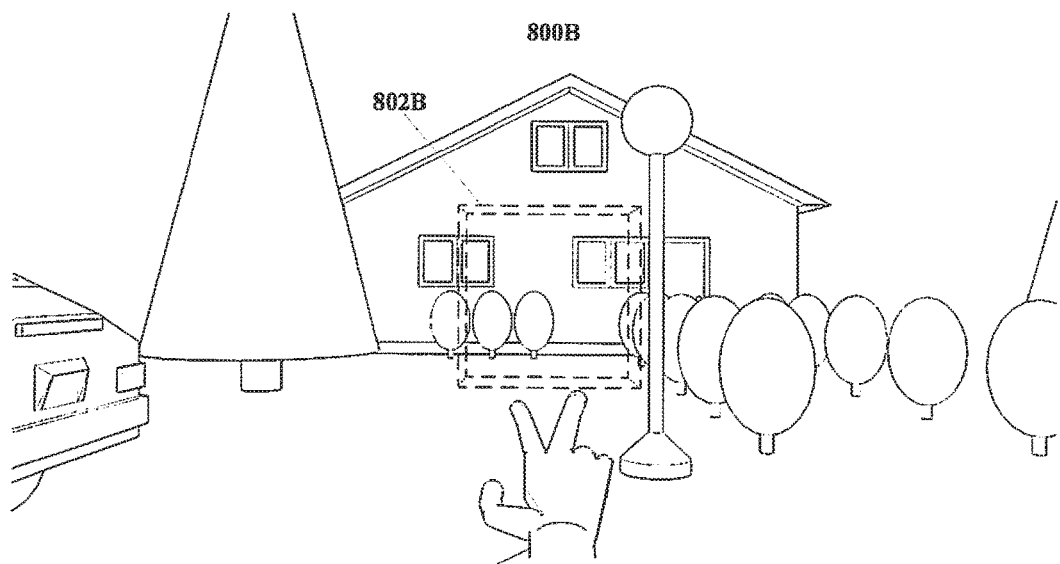

In FIG. 8B, the environment 800B and the three dimensional region 802B remain. Also, an actor 804B, more particularly an end-effector in the form of a human hand, is also shown having been disposed within the three dimensional space of the environment 800B, visible in the field of view as shown. As illustrated, the hand 804B is not within the three dimensional space of the region 802B.

Figure 8C:
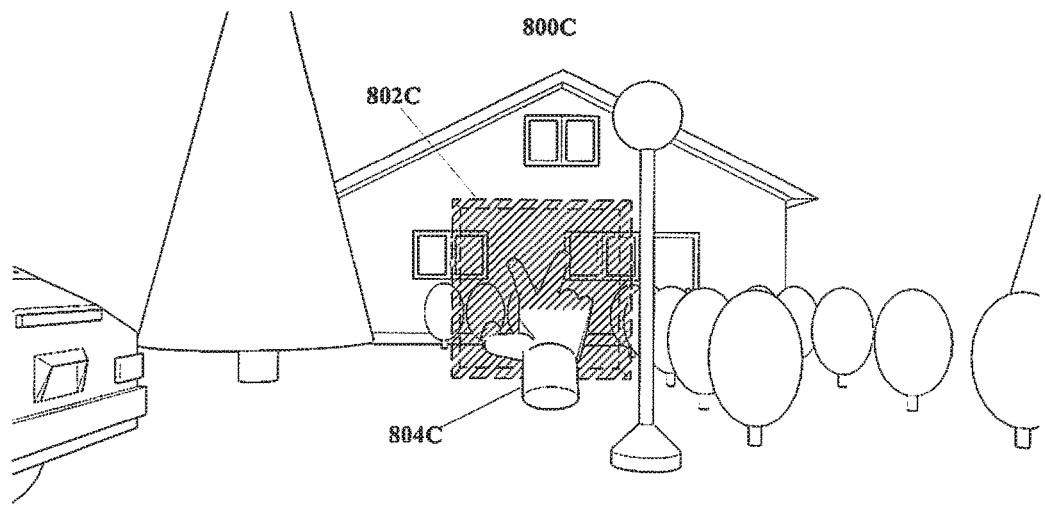

In FIG. 8C, the environment 800C, the region 802C, and the hand 804C are again visible. However, the hand 804C has moved such that the tips of the first and second fingers thereof are disposed within the region 802C. The front face of the region 802C is hatched to more clearly indicate that a portion of the hand 804C is disposed within the region 802C. In practice, the entry into and/or presence within the region 802C of the hand 804C may not be so highlighted, though visible or other changes, e.g. changes to provide feedback to a user as to whether the hand 804C is in fact disposed within the region 802C, also is not excluded. It is also noted that the first and second fingers of the hand 804C are spread apart, such that the hand 804C may be considered to be executing a posture, that is, a static configuration.

In principle, any or nearly any possible substantially static configuration of the hand 804C may be considered a posture, and the present disclosure is not particularly limited with regard to what posture or postures are utilized as actor inputs. The arrangement illustrated in FIG. 8C, wherein first and second fingers are spread, is an example only, presented for purposes of clarity; other arrangements may be equally suitable.

With consideration to method steps as shown in previous FIG. 1 through FIG. 5, for an embodiment of the present disclosure as shown in FIG. 8C wherein the actor is defined as a human hand 804C, and wherein the input is defined as a posture wherein the first and second fingers of the hand 804C are spread as illustrated in FIG. 8C, and further wherein environmental parameters are defined such that the hand 804C is to be disposed within a region 802C as illustrated in FIG. 8C, then given the arrangement shown in FIG. 8C the input may be considered to have been executed by the actor (hand) 804C. Method steps further to execution of an actor input in a method according to the present disclosure may then take place.

Figure 8D:
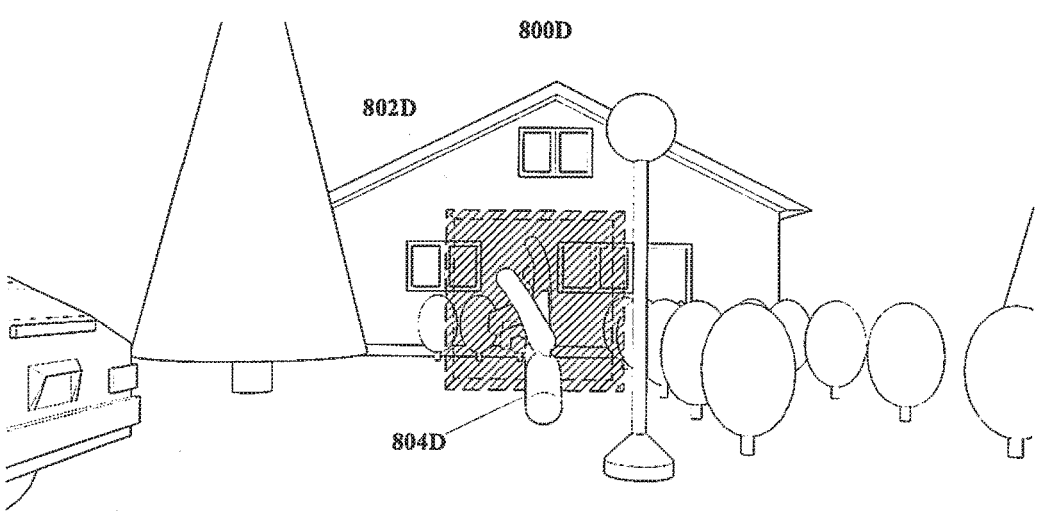

FIG. 8D shows an arrangement wherein a gesture from a hand 804D, rather than a static posture of a hand 804D, may be defined as input. In FIG. 8D, the environment 800D, the region 802D, and the hand 804D are again visible. The hand 804D in particular remains in a configuration with the first and second fingers spread, and with the tips of the first and second fingers of the hand 804D disposed within the region 802D.

However, an examination of FIG. 8C and FIG. 8D reveals that the in FIG. 8D the hand 804D has rotated clockwise at the wrist by approximately 90 degrees, such that the positions of the tips of the fingers of the hand 804D are different relative to the region 802D than was true in FIG. 8C. In other words, FIG. 8C and FIG. 8D together show a motion of the hand 804C and 804D, specifically a clockwise rotation thereof.

With consideration to method steps as shown in previous FIG. 1 through FIG. 5, for an embodiment of the present disclosure as shown in FIG. 8C and FIG. 8D wherein the actor is defined as a human hand 804C and 804D, and wherein the input is defined as a gesture wherein the first and second fingers of the hand 804C and 804D rotated clockwise while spread as illustrated in FIG. 8C and FIG. 8D, and further wherein environmental parameters are defined such that the hand 804C and 804D is to remain disposed within a region 802C and 802D for the aforementioned rotation as illustrated in FIG. 8C and FIG. 8D, then given the arrangement shown in FIG. 8C and FIG. 8D the input may be considered to have been executed by the actor (hand) 804C and 804D. Method steps further to execution of an actor input in a method according to the present disclosure may then take place.

As noted with regard to postures, in principle any or nearly any possible change in configuration, position, etc. of the hand 804C and 804D may be considered a gesture. The present disclosure is not particularly limited with regard to what gesture or gestures are utilized as actor inputs. The arrangement illustrated in FIG. 8D, wherein first and second fingers are spread and the hand 804 is rotated, is an example only, presented for purposes of clarity; other arrangements may be equally suitable.

Figure 9A:
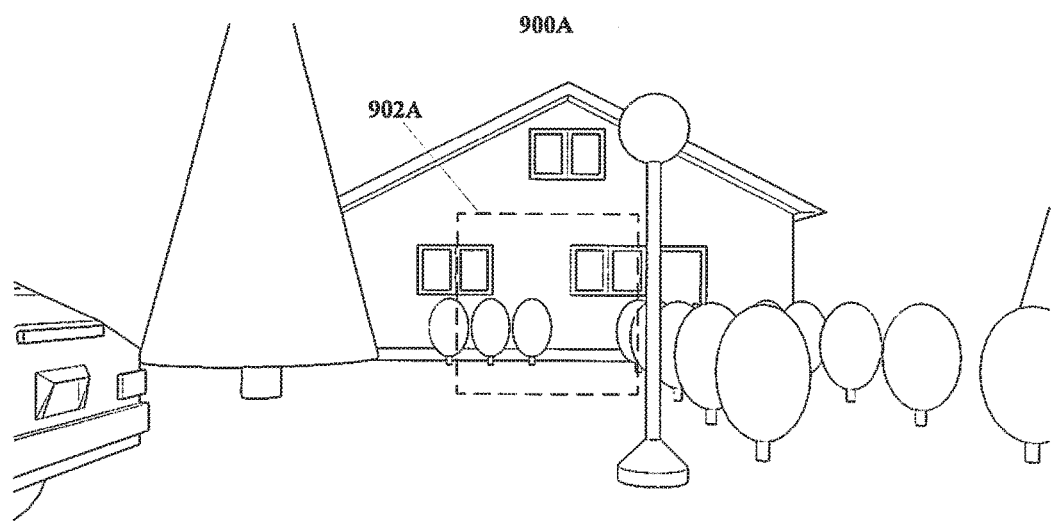
FIG. 9A through FIG. 9C show another region in accordance with the present disclosure, and an actor executing input therein.
Figure 9B:
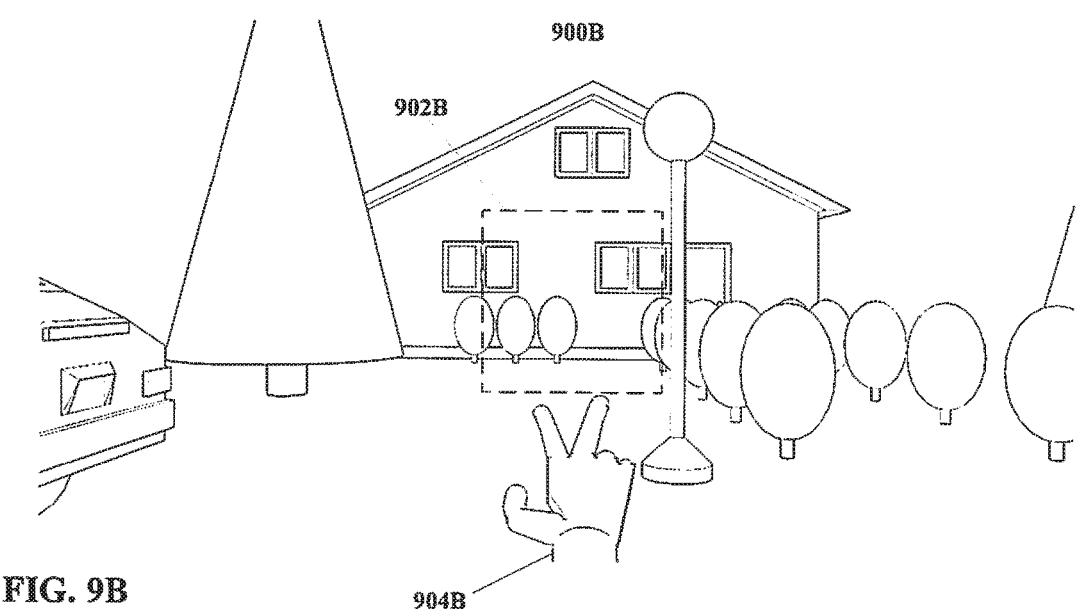
Figure 9C:
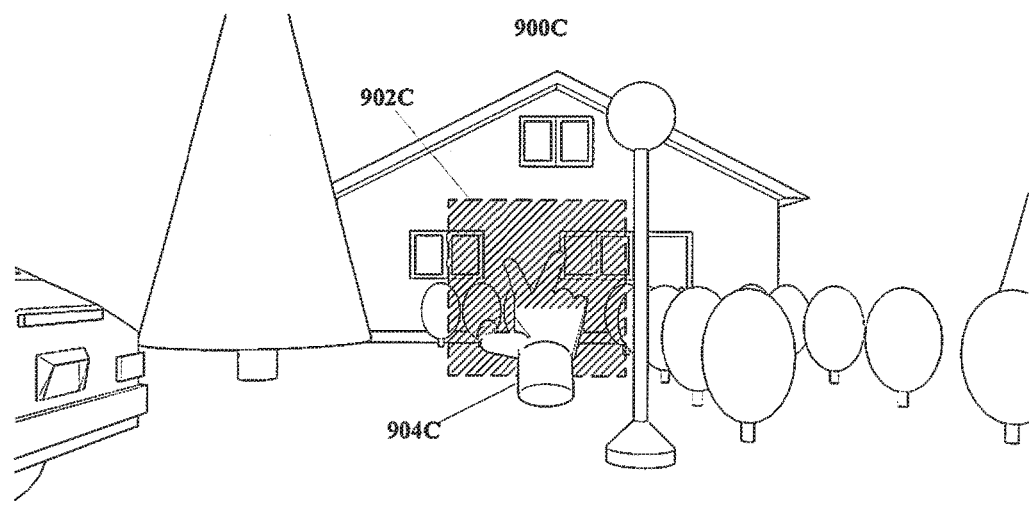

As has been previously stated, although a region defined for execution of actor input may be three dimensional, such a region is not necessarily required to be three dimensional. Turning to FIGS. 9A through 9C, an arrangement similar to that of FIGS. 8A through 8D is shown wherein a two dimensional region is defined instead.

In FIG. 9A, a field of view of an environment 900A is shown therein. FIG. 9A also shows a two dimensional region 902A defined within the field of view. As shown, the region 902A is rectangular, however this is an example only and other shapes may be equally suitable.

Turning to FIG. 9B, the environment 900B and the region 902B remain. Also, an actor 904B, more particularly an end-effector in the form of a human hand, is also shown having been disposed within the three dimensional space of the environment 900B, visible in the field of view as shown. As illustrated, the hand 904B is not within the region 902B.

In FIG. 9C, the environment 900C, the region 902C, and the hand 904C are again visible. However, the hand 904C has moved such that the tips of the first and second fingers thereof are disposed within the region 902C. The region 902C is hatched to more clearly indicate that a portion of the hand 904C is disposed therein. It is noted that the first and second fingers of the hand 804C are spread apart, such that the hand 804C may be considered to be executing a posture, that is, a static configuration.

With regard to the region 902C, it is noted that as shown in this example the region 902C is defined at a three dimensional position, i.e. at a particular depth from the point of view that defines FIG. 9A. That is, in the arrangement shown in FIG. 9C the hand 904C must be at a particular distance (or more properly a range of distances) for the fingers thereof to be within the region 902C. As shown in FIG. 9C the region 902C is essentially a planar shape, at a specific distance.

However, this is an example only, and other arrangements, including but not limited to a region with a location defined in only two dimensions (e.g. heading and elevation but not distance) may also be equally suitable. Such a region could be defined for example as a box with height and breadth but unlimited depth, or as a wedge with angles of heading and elevation but unlimited radial distance. In such instance, rather than disposing a hand at a particular depth, merely overlapping the hand over the region might be sufficient to consider the fingers thereof to be within the region. Other arrangements also may be equally suitable.

Returning to the specific example of FIG. 9C, and with consideration to method steps as shown in previous FIG. 1 through FIG. 5, for an embodiment of the present disclosure as shown in FIG. 9C wherein the actor is defined as a human hand 904C, and wherein the input is defined as a posture wherein the first and second fingers of the hand 904C are spread as illustrated in FIG. 9C, and further wherein environmental parameters are defined such that the hand 904C is to be disposed within a region 902C as illustrated in FIG. 9C, then given the arrangement shown in FIG. 9C the input may be considered to have been executed by the actor (hand) 904C. Method steps further to execution of an actor input in a method according to the present disclosure may then take place.

Figure 10:
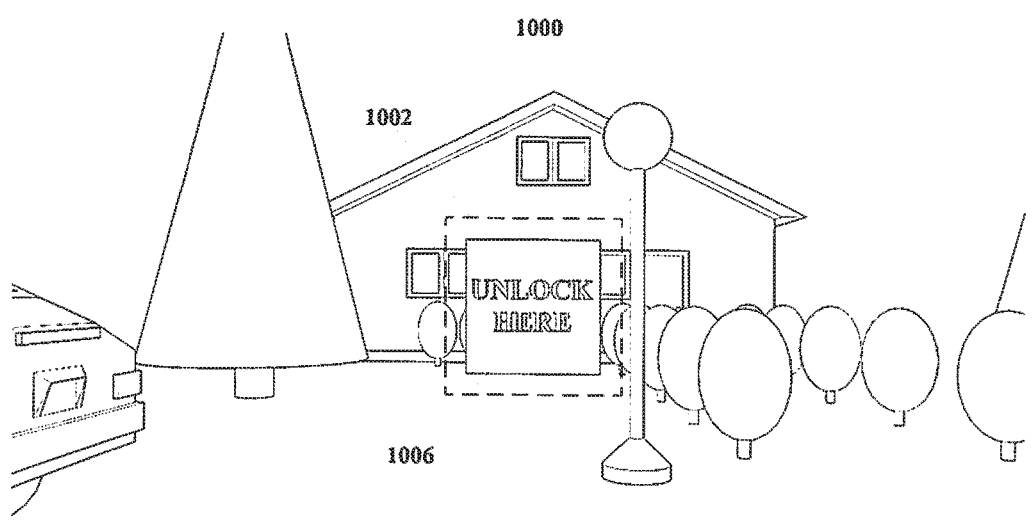
FIG. 10 shows another region in accordance with the present disclosure, and a virtual object disposed therein.

Turning to FIG. 10, as previously stated a defined region may not be visible, but visibility is not necessarily excluded.

FIG. 10 shows a field of view of an environment 1000 therein. FIG. 10 also shows a region 1002 defined within the field of view.

In addition, FIG. 10 shows a virtual object 1006 in the form of a graphic, more particularly an image marked with text "UNLOCK HERE". Use of a graphic, other virtual object, and/or other indicator may be useful for certain embodiments, for example in assisting a user in identifying the location of a region for executing an actor input. In addition, such graphics or other indicators may convey other information directly, e.g. a virtual object could indicate what actor input is to be executed through use of a text, a static image showing a hand posture, an animated video loop of a hand gesture, etc.

However, the arrangement shown in FIG. 10 is an example only, and other arrangements may be equally suitable. In particular, the arrangement shown in FIG. 10 illustrates a two dimensional region 1002 with a two dimensional virtual object 1006, but the use of three dimensional regions and/or virtual objects is not excluded.

Figure 11:
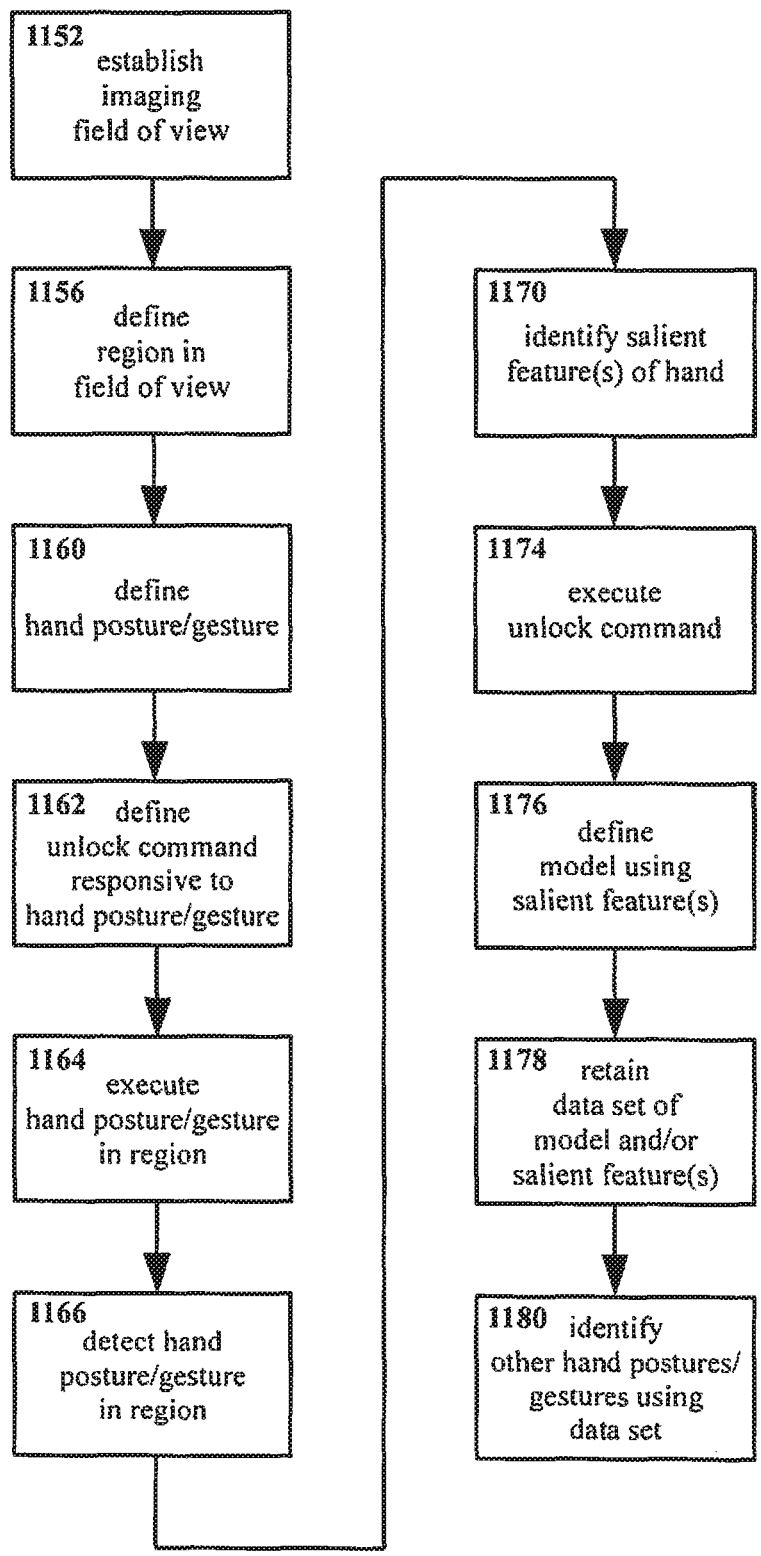
FIG. 11 shows another example embodiment of a method for interacting with an interface in accordance with the present disclosure, using a visual environment.

With regard to FIG. 11, a method of manipulating an interface is shown therein. The method shown in FIG. 11 bears some resemblance to the methods shown in FIG. 1 through FIG. 5, however, the method of FIG. 11 is presented with respect to an example interface similar to the example of FIG. 6 through FIG. 10, that is, an example interface that is visually based, that uses an end-effector in the form of a human hand as an actor, with inputs in the form of hand gestures and/or hand postures. As such, an example method specific to a visually oriented arrangement is presented for purposes of clarity. However, it is emphasized that this is an example only, and that other methods and other arrangements may be equally suitable.

In the method of FIG. 11, an imaging field of view is established 1152. A region is defined 1156 within the field of view. A hand posture and/or gesture is defined 1160. The hand posture and/or gesture are visible, but are not otherwise particularly limited. For example, postures and/or gestures may include but are not limited to those utilizing one hand, both hands, individual fingers on one or both hands, motions, dwell times or other time intervals, rates of motion or other change, particular translation and/or orientation and/or spacing, changes thereof, etc. Other arrangements may be equally suitable.

An unlock command is defined 1162, responsive to the hand posture/gesture previously defined in step 1160, as performed within the region defined in step 1156. That is, an unlock command e.g. to a processor or other system is defined such that when the hand posture/gesture as defined is performed within the region as defined, the unlock command is executed. Typically, though not necessarily, the unlock command wakes, activates, or otherwise readies the system in question for further commands and/or use.

The posture/gesture is executed 1164 within the region.

An image of the hand posture/gesture being executed within the region is received 1166. The region in the image is then evaluated so as to identify 1170 at least one salient feature of the hand therein. In addition, the unlock command is executed 1174, as previously defined in step 1162 in association with execution of the hand posture/gesture.

It is noted that execution of the unlock command may be made conditional, for example as a security feature. That is, execution of the unlock command may be performed only if the salient features identified match a reference data set. For example, matching might require that if certain types of salient features are identified, only if certain specific values or arrangements of reference salient features are identified, etc., if for example such reference salient features (or data regarding such reference salient features) are stored or otherwise available for comparison. Similarly, matching might require matching salient features identified from an actor with a reference model.

Such an arrangement may be used to limit unlocking of a device, computer system, etc. to only one or more specific individuals based on the particulars of those individuals' hand structure, patterns of motion, etc. It is also pointed out that such security features are not limited only to the use of hand postures/gestures as in the example embodiment of FIG. 11, but may be applied generally to actors and inputs in other embodiments. Thus, restrictions to only certain facial geometries, facial postures, brainwave patterns, etc. could be used to render execution of an unlock or other command conditional, so as to provide security thereby.

Returning to FIG. 11, a model is defined 1176 using the salient feature(s) identified in step 1170. A data set including some or all of the salient features identified in step 1170 and/or the model defined in step 1176 is then retained 1178. In addition, at some point that retained data set used to identify the hand in other inputs 1180.

Figure 12:
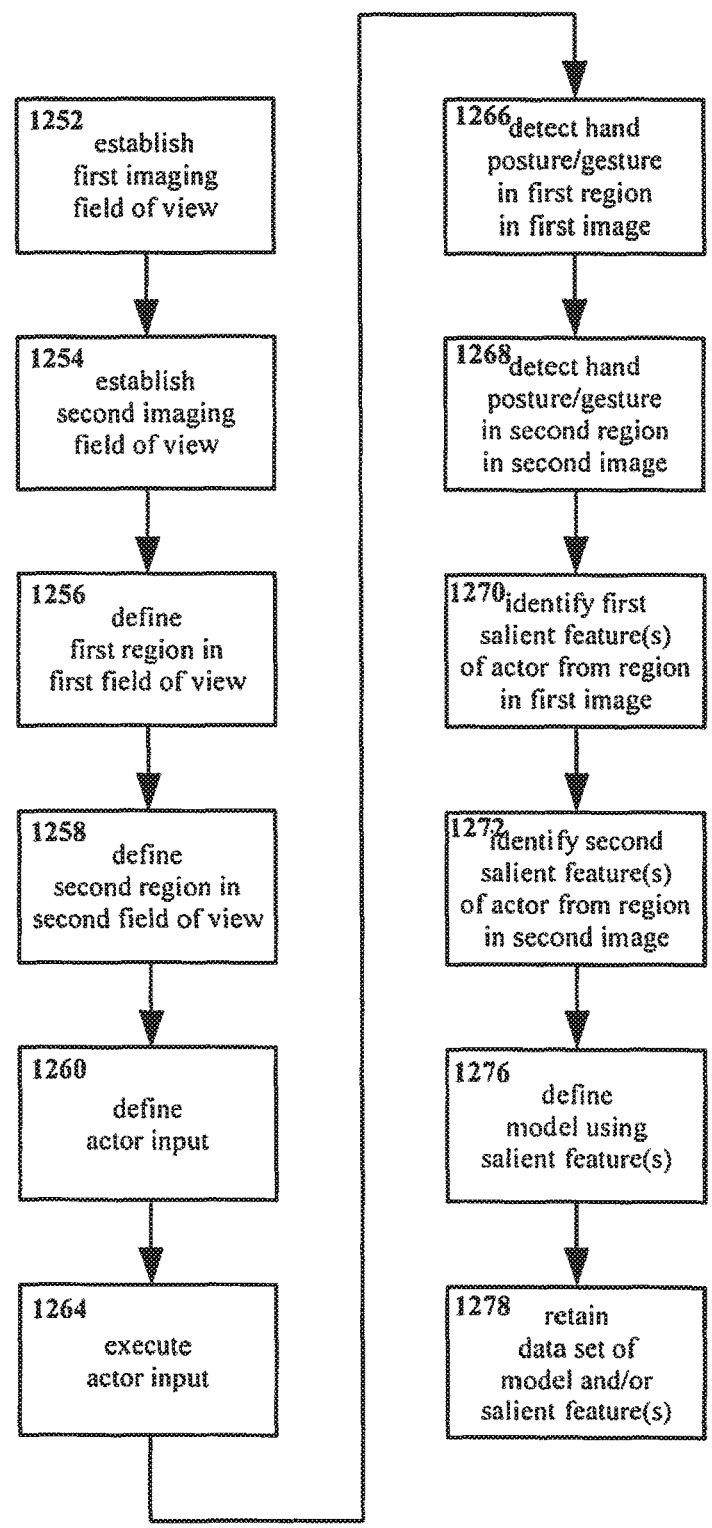
FIG. 12 shows an example embodiment of a method for interacting with an interface in accordance with the present disclosure, using two images.

Moving to FIG. 12, the present disclosure may utilize multiple sensors or other input systems to detect an actor input. Thus, for a visual arrangement similar to that used for the method of FIG. 11, a system might utilize two or more cameras or other imagers, and may evaluate the actor input to identify salient features based on the presence of the actor in multiple images from those two or more cameras. It is noted that for arrangements using only one image sensor, multiple images may also be used; the example of FIG. 12 provides explanation for an example arrangement wherein images are generated by two distinct image sensors.

As with FIG. 11, the method shown in FIG. 12 is presented with respect to an example interface that is visually based, using imaging fields of view and receiving images thereof. However, it is emphasized that this is an example only, and that other methods and other arrangements may be equally suitable.

In the method shown in FIG. 12, a first imaging field of view is established 1252. In addition, a second imaging field of view is established 1254. The first and second imaging fields of view may overlap, and/or may include some or all of the same environment and objects therein. In particular, for some embodiments it may be useful to configure first and second imaging fields of view so as to provide a stereo arrangement. However, the present disclosure is not particularly limited with respect to overlap or similarity of the first and second fields of view, and other arrangements may be equally suitable.

A first region is defined 1256 within the first field of view. A second region is also defined 1258 within the second field of view.

An actor input is defined 1260. The actor input is executed 1264. First and second images are received 1266 and 1268, representing the first and second fields of view, respectively.

It is again noted that while the first and second fields of view may be similar, this is not required. Likewise, the first and second regions may be similar, but this also is not required. It is in principle possible for the first and second fields of view, and/or the first and second regions, to be entirely non-overlapping. For example, an embodiment might require actor inputs in two distinct regions, as captured within two distinct fields of view, whether simultaneously, in sequence, etc. Moreover, although the example of FIG. 12 assumes only one actor input is defined for both the first and second regions, in other embodiments it may be equally suitable to utilize a first actor input in the first region and a second actor input in the second region. However, these are examples, only, and other arrangements may be equally suitable.

Returning to the arrangement of FIG. 12, the first and second images are evaluated to as to identify at least one first salient feature 1270 and to identify at least one second salient feature 1272 respectively therein. A model of the actor is then defined 1276 using the first and/or the second salient features. A data set including some or all of the first and/or second salient features and/or the model is then retained 1278.

It is noted that, for configurations wherein a single actor is imaged in both the first and second regions, and where images include similar data, the first salient features and the second salient features may be similar. Indeed, some or all of the first and second salient features may be identical, the same features having been identified from the first and second images. However, this is not necessarily the case for all embodiments. For example, as noted multiple actors may be used. In addition, the first and second images may include different data, e.g. one may image in visible light while another images in infrared light, or one may image using light while another images using ultrasound, etc. In such instances, the first salient features and second salient features may be dissimilar, even if a single actor is a source for both the first and second salient features.

In addition, although the method shown in FIG. 12 illustrates only one model being defined 1276 from both the first and the second salient features, in other embodiments it may be useful to generate distinct models from the first salient features and the second salient features. Indeed, generation of multiple models from any set of salient features (whether or not multiple sets of salient features are identified) is permissible within the present disclosure.

Figure 13:
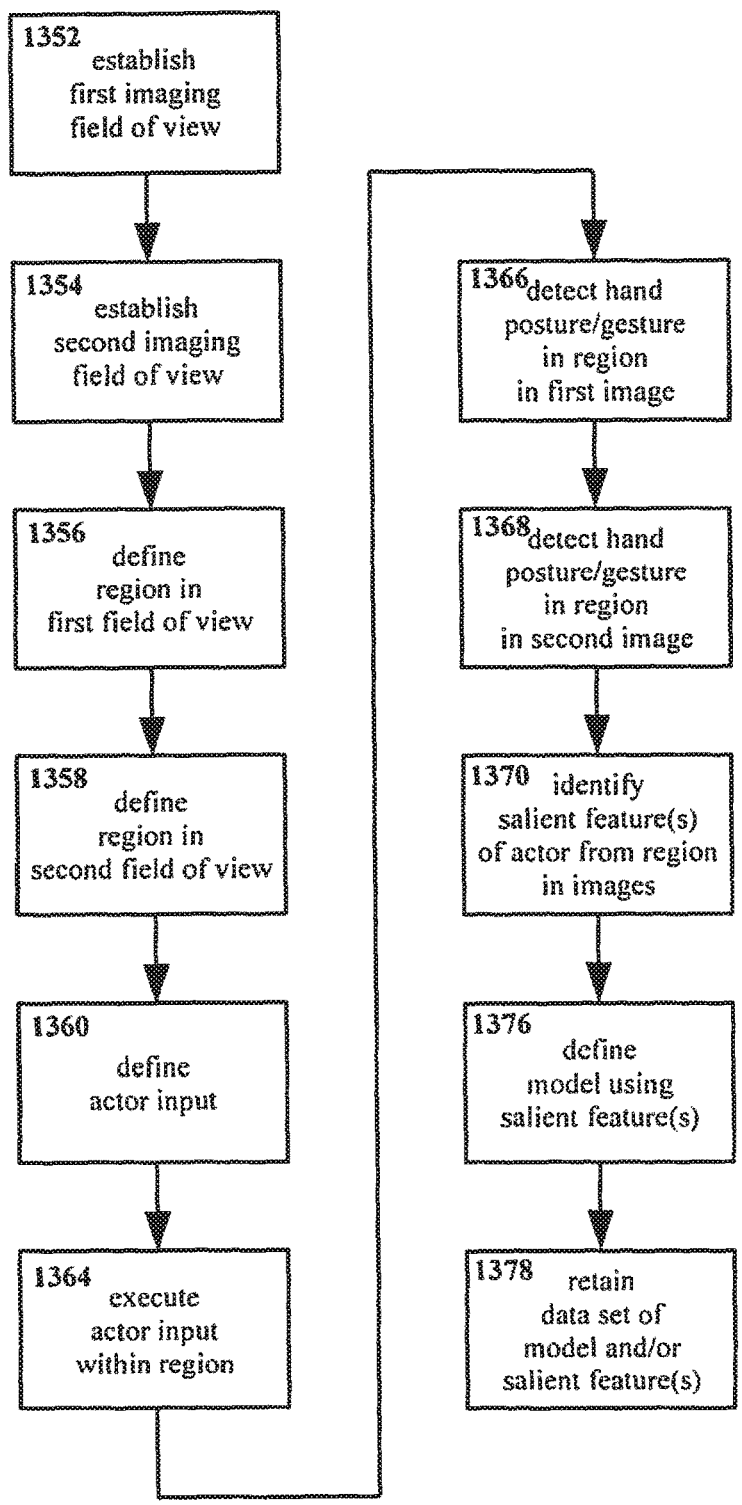
FIG. 13 shows another example embodiment of a method for interacting with an interface in accordance with the present disclosure, using two images.

With regard to FIG. 13, as noted some embodiments of the present disclosure using data from two or more sensors may utilize similar and/or overlapping regions. In addition, for some embodiments a single region may be defined in space, at such a position that the same region appears (albeit possibly from different perspectives) in both first and second images. In particular, a single region may be defined so as to be visible in two sensors disposed in a stereo configuration, although this is an example only and other arrangements may be equally suitable.

Given such an arrangement, FIG. 13 presents an example of a method for interacting with an interface.

In the method shown in FIG. 13, a first imaging field of view is established 1352. In addition, a second imaging field of view is established 1354. A region is defined so as to appear within the first field of view 1356, that same region also being defined so as to appear within the second field of view 1358. It is noted that definition may be a single step, i.e. it is not necessary for all embodiments to define the region separately for individual fields of view. Rather, the field of view may be defined as a single volume, location, etc. in space, such as would naturally appear in multiple fields of view that include the relevant volume, location, etc. in space. This may be true even if two or more sensors sense different data, e.g. if one senses visible light and another senses infrared light it may still be possible for fields of view to have a single region defined therein with respect to both.

An actor input is defined 1360. The actor input is executed 1364 within the region previously defined in steps 1356 and 1358. First and second images are received 1366 and 1368, representing the first and second fields of view, respectively. It is noted that the region appears, at least in part, in both the first and the second images. As such, it may be presumed, at least for the specific example described herein, that the first and second imaging fields of view overlap to at least some degree. In particular, for some embodiments it may be useful to configure first and second imaging fields of view so as to provide a stereo arrangement. However, this is an example only, and other arrangements may be equally suitable.

The first and second images are evaluated to as to identify at least one salient feature 1370 of the actor therein. It is not necessarily required that any particular salient feature be identified in each or in both the first and second images. A salient feature may appear in only the first image, only the second image, or in both images.

A model of the actor is then defined 1376 using the salient features. A data set including some or all of the salient features and/or the model is then retained 1378.

Figure 14:
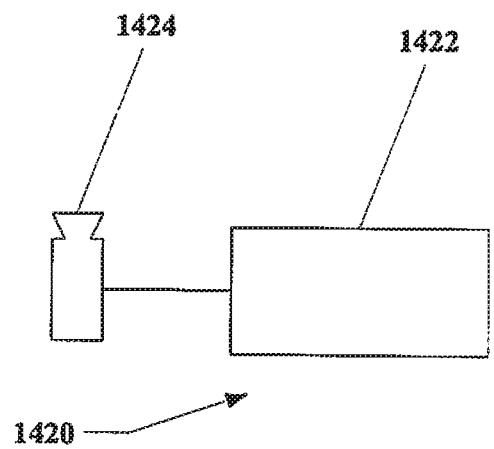
FIG. 14 shows a schematic of an example embodiment of an apparatus in accordance with the present disclosure.

Moving on to FIG. 14, an embodiment of an apparatus 1420 for interacting with an interface is shown. The apparatus 1420 includes a processor 1422, and a sensor 1424 in communication with the processor 1422.

The processor 1422 is adapted to define one or more actor inputs. The sensor 1424 is adapted to detect one or more actor inputs as defined by the processor. In addition, the processor 1422 is adapted to evaluate the actor input as detected by the sensor 1424, and to identify one or more salient features of the actor therefrom. The processor 1422 is also adapted to generate a model of the actor from the salient features, and to retain a data set including some or all of the salient feature(s) and/or the model.

A range of general-purpose, special-purpose, and embedded systems may be suitable for use as the processor 1422. Moreover, it may be equally suitable for the processor 1422 to consist of two or more physical or logical processor components.

A range of devices also may be suitable for use as the sensor 1424. As illustrated in FIG. 14, the sensor 1424 is a compact digital camera, adapted to capture images and/or video. A range of cameras, including but not limited to CMOS and CCD cameras, may be suitable. Moreover, sensors other than cameras likewise may be equally suitable, and sensors that capture information other than images and/or video may be equally suitable.

The sensor 1424 is not particularly limited with regard to either what precise event(s) the sensor 1424 may sense in detecting the actor input, or how the sensor 1424 may sense the actor input. For certain embodiments, it may be useful for the sensor 1424 to sense the three dimensional position and/or three dimensional motion of the actor. For example, a sensor 1424 adapted to sense the three dimensional position/motion of such an actor could provide position data that would indicate whether the end-effector is disposed within a defined region within a field of view. However, other arrangements may also be equally suitable.

The manner by which the processor 1422 is in communication with the sensor 1424, and (if present, see below) other components is not particularly limited. As illustrated in FIG. 14, components are shown to communicate by wire link, but other arrangements, including but not limited to wireless communication, may be equally suitable.

Likewise, the manner for initiating and/or controlling definition of an actor, an input, a region, etc. is not particularly limited. Similarly, the manner for identifying salient features, for generating the model, and for storing the data set, is not particularly limited. For certain embodiments, it may be useful for a general operating system instantiated on the processor 1422 to initiate and/or control such functions.

However, the use of an operating system in such fashion is an example only, and other arrangements may be equally suitable.

In the example illustrated in FIG. 14, the processor 1422 may be considered to include storage therewith suitable for storing the salient features. Various systems may be suitable for storing salient features and/or models in a data set, including but not limited to separate memory chips, hard drives, etc., and memory systems integrated with the processor 1422. Moreover, storage may or may not be local to the apparatus 1420, i.e. storage may be on remote hardware in communication with the apparatus 1420, in a "cloud" system, or otherwise physically distinct and/or distant from the processor 1422 and/or other components of the apparatus 1420.

Figure 15:
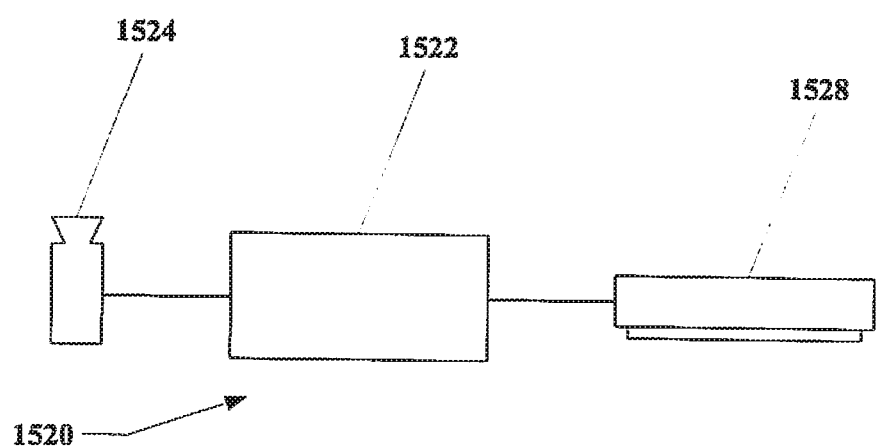
FIG. 15 shows a schematic of an example embodiment of an apparatus in accordance with the present disclosure, with a display.

FIG. 15 shows another embodiment of an apparatus 1520 for interacting with an interface in accordance with the present disclosure. The apparatus 1520 includes a processor 1522, and a sensor 1524 in communication with the processor 1522.

In addition, the apparatus includes a display 1528 in communication with the processor 1522. The display 1528 is adapted to output at least a portion of the field of view of the sensor 1524. Typically, though not necessarily, the display 1528 will output a portion of the field of view including a region defined therein, the region being defined as a location for the actor input. For embodiments wherein the region itself is partly or wholly visible as an entity unto itself, the display 1528 may also be adapted to display the region. The display 1528 may also be adapted to output additional information, e.g. a graphic or other virtual or augmented object on or near the region, text and images and/or other information (which may or may not be related to the environment and/or the region), etc.

A range of devices may be suitable for use as the display 1528, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that output images directly onto a user's eyes also may be equally suitable. Either digital or analog display technologies may be suitable.

Figure 16:
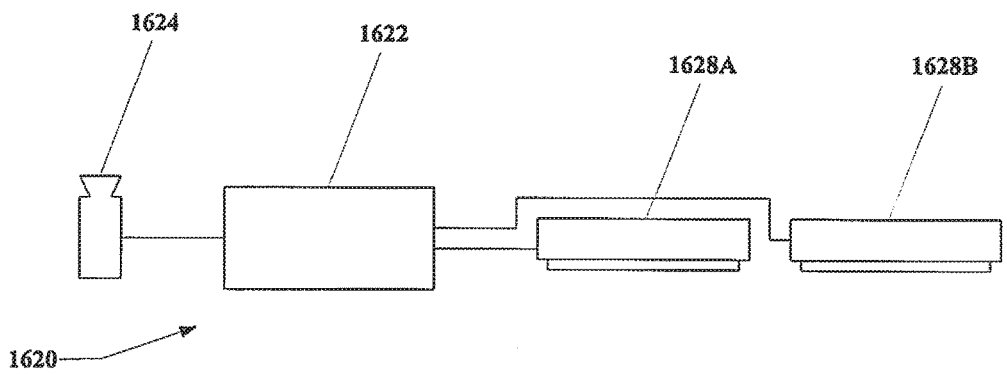
FIG. 16 shows a schematic of an example embodiment of an apparatus in accordance with the present disclosure, with dual displays.

Embodiments of an apparatus according to the present disclosure may include multiple instances of some or all components described herein. For example, in FIG. 16 shows an arrangement of an apparatus 1620 with multiple displays 1628A and 1628B, along with a processor 1622 and a sensor 1624. In such instance, the displays 1628A and 1628B may form a stereo system, with the first display 1628A and second display 1628B being adapted to output stereo images. The processor 1622 may also be adapted to define a region in three dimensions, with the first and second displays 1628A and 1628B likewise outputting a view of an environment in three dimensions.

Such a display arrangement may be useful for some embodiments, as it enables the outputting of three dimensional objects, environments, interfaces, effects, etc., by outputting slightly different images to the first and second displays 1628A and 1628B, comparable to what would be seen by a user's left and right eyes if they were looking at an entirely physical environment in three dimensional space. However, the use of a stereo display system is an example only, and other arrangements may be equally suitable.

Figure 17:
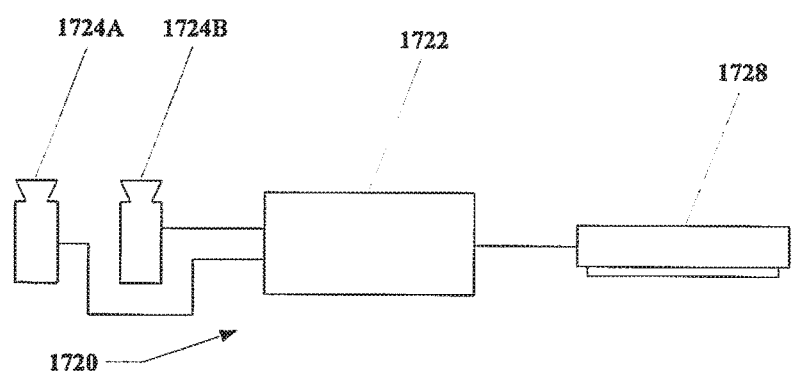
FIG. 17 shows a schematic of an example embodiment of an apparatus in accordance with the present disclosure, with dual sensors.

Referring to FIG. 17, an embodiment is shown of an apparatus 1720 with multiple sensors 1724A and 1724B, along with a processor 1722 and a display 1728.

Sensors 1724A and 1724B may form a stereo system, with the first sensor 1724A and second sensor 1724B being adapted to obtain stereo images. Such a stereo arrangement may be useful, for example as an approach for determining whether an actor such as a hand is disposed within a region defined by the processor 1722. However, this is an example only, and other arrangements may be equally suitable.

Figure 18:
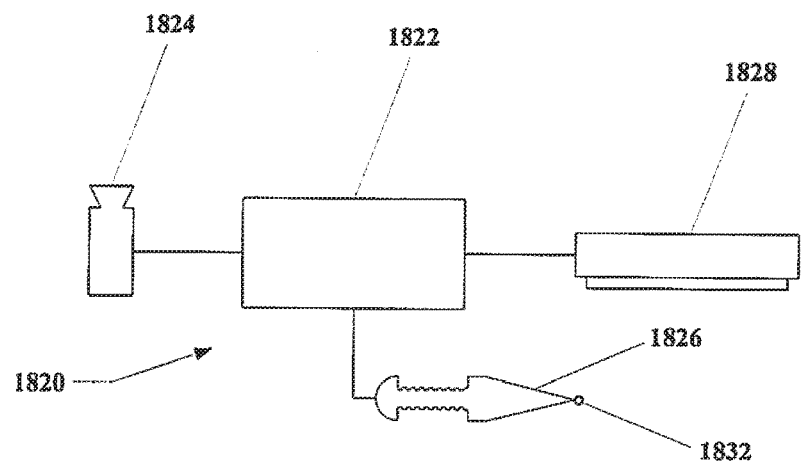
FIG. 18 shows a schematic of an example embodiment of an apparatus in accordance with the present disclosure, with a stylus as an actor.

FIG. 18 shows an embodiment of an apparatus 1820 that includes an actor 1826 in the form of a stylus as part of the apparatus 1820 proper, the actor 1826 being in communication with the processor 1822. As previously noted, a range of possible actors may be suitable for use with the present disclosure, not all of which (e.g. a human hand) are necessarily part of the apparatus itself. However, as shown in FIG. 18 the use of a stylus or other actor 1826 that is incorporated with the apparatus 1820 also is not excluded.

In addition, as shown in FIG. 18, an actor may include one or more indicators 1832 thereon adapted to serve as marker points. For example, an indicator 1832 might be, as shown in FIG. 18, a light marking a tip or other significant feature of an actor 1826 such as a stylus, so as to facilitate sensing of the indicator 1832 by the sensor 1824. The indicator 1832 may itself serve as a salient feature, and/or may serve as a marker for providing greater visibility (or for non-visual embodiments, greater detectability), etc. A wide range of indicators 1832 may be suitable for use with the present disclosure, including but not limited to lights, surface markings, and geometrical features. However, the use of an indicator 1832 is an example only.

The present disclosure may be incorporated into and/or utilized with a broad range of other devices. For example, with apparatus 1920 of FIG. 19 configured as a head mounted display in accordance with the present disclosure. However, it is emphasized that the present disclosure is not limited only to head mounted displays or even to mobile devices more generally.

Figure 19:
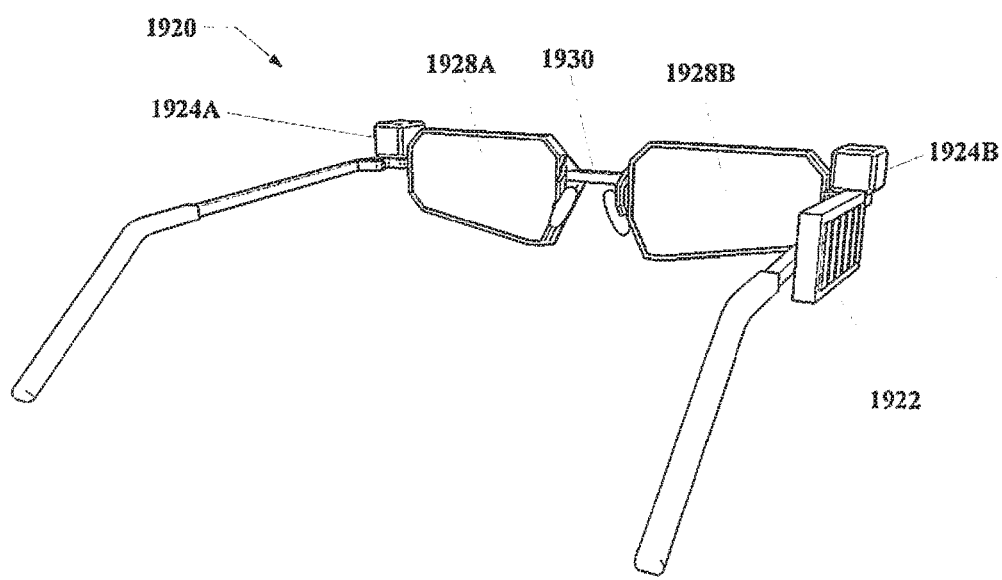
FIG. 19 shows an embodiment of a head mounted display in accordance with the present disclosure.

The embodiment shown in FIG. 19 includes a processor 1922, first and second sensors 1924A and 1924B in a stereo arrangement, and first and second displays 1928A and 1928B also in a stereo arrangement. In addition, the apparatus 1920 includes a body 1930 in the form of a frame for a head mounted display. As shown the body 1930 resembles a pair of glasses, but this is an example only, and other configurations may be equally suitable.

The displays 1928A and 1928B are mounted to the body 1930, with the body 1930 being configured and the displays 1928A and 1928B being mounted such that when a user wears the apparatus 1920, the displays 1928A and 1928B are disposed proximate to and substantially aligned with the user's eyes. Likewise, the sensors 1924A and 1924B mounted to the body 1930 such that when a user wears the apparatus 1920 the fields of view of the sensors 1924A and 1924B include a region in front of the user, e.g. where the user would execute hand postures and/or gestures as input, and thus one suitable position for defining a region. In the arrangement of FIG. 19, the processor 1922 is also mounted to the body 1930.

However, such an arrangement is presented as an example only, and other embodiments may be equally suitable.

As noted, defining a region for an actor input, and/or applying other parameters to an actor input, can reduce the amount of image or other data that must be processed in order to identify salient features, etc. Other approaches for further reducing the amount of data to be processed may also be possible with the present disclosure.

Figure 20:
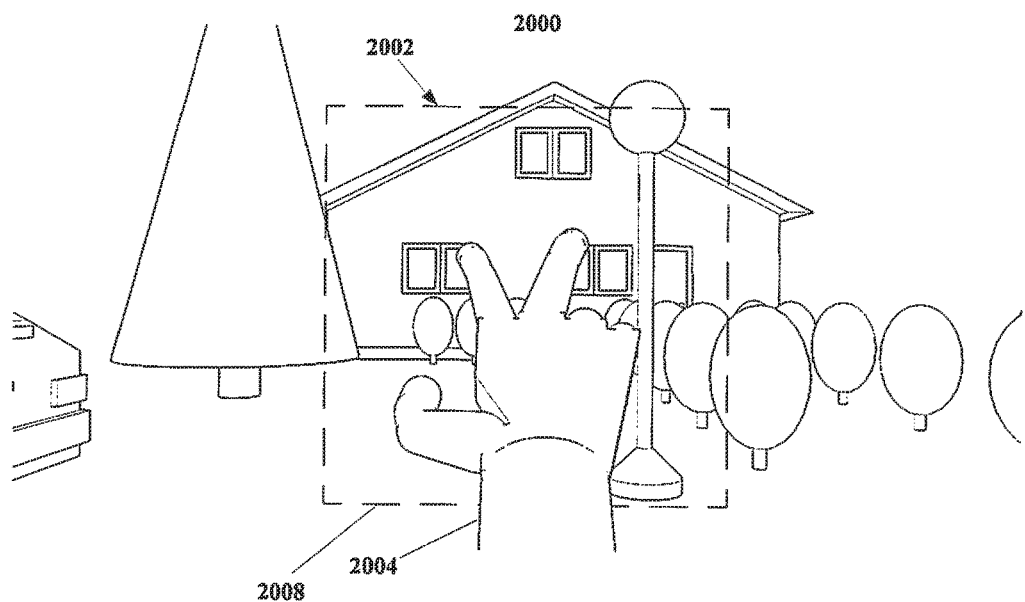
FIG. 20 shows another region in accordance with the present disclosure.

For example, referring to FIG. 20, a field of view of an environment 2000 is shown. A substantially two dimensional region 2002 is defined in space, with an actor 2004 in the form of a hand shown disposed within the region. (It is noted that the field of view as shown in FIG. 20 is zoomed closer to the region 2002 relative to what is shown for example in FIGS. 9A through 9C.)

As a possible approach for reducing data processing, image processing (e.g. to identify salient features) could be initiated at the bottom edge 2008 of the region 2002. For an arrangement wherein the actor 2004 is a user's hand, as shown, with the hand 2004 disposed within the region 2002 the user's arm and/or wrist will extend past the bottom edge off the region 2002, as may be seen in FIG. 20.

With some portion of the user's hand 2004 normally present at the bottom edge 2008 of the region 2002 when the user's hand 2004 is within the region, initiating image processing at the bottom edge 2008 (e.g. in a horizontal stripe running substantially parallel to the bottom edge 2008) may be expected to result in detection of at least a portion of the user's hand 2004 relatively early. Having detected even a portion of the user's hand 2004, finding the remainder of the user's hand 2004, and thus salient features associated therewith, may be accomplished more rapidly.

Another possible approach for efficiently locating the user's hand 2004 (or other actor) within a region from an image could utilize information from one or more previous images. That is, having located a salient feature at a particular location in a first image of the field of view, a search for the location of that salient feature could be initiated at a corresponding location in a second (i.e. subsequent) image of the field of view. If the first and second images are taken relatively close together in time, then unless the user's hand 2004 (and thus the salient features thereof) have moved very rapidly, the salient features in the second image should be close to corresponding locations in the first image.

Consequently, searching a second image for salient features at the positions that those salient features occupied in a first image may result in reduced search time and reduced image processing (under the expectation that image processing might be concluded once sufficient salient features are located and identified). Variations on such an approach, such as searching horizontal stripes of a second image corresponding to positions of salient features in a corresponding first image, may also be useful.

In addition, with or without a second image, a possible approach for reducing data processing could include beginning a search for a salient features in a horizontal stripe. For certain actors, including but not limited to hands, styluses held in hands, etc. and certain sensor arrangements including but not limited to imagers disposed on a head-mounted display, an actor typically will be arranged in a substantially vertical configuration within the field of view. For example, given a user's hand disposed within a field of view of a camera on a head mounted display, the user's arm and hand extend generally from the bottom edge of the field of view upwards. While particular gestures and/or postures of the hand may result in an arrangement that is not purely vertical, the overall configuration—arm and hand extending substantially upward from the bottom of the field of view—is reliably present when the hand is within the field of view. Arrangements with the arm extending downward from the top of the field of view is not typically expected, for example. Thus, given such a substantially vertical arrangement for an actor, a horizontal line through the field of view frequently will intersect the actor at some point. The intersection may itself constitute or be usable as a salient feature, and once the intersection is found the search can then follow the edge of the actor and/or expand into the area of the actor to identify additional salient features as necessary or desirable.

Another possible approach for reducing data processing could include discrimination of areas within an image based on the apparent properties of those areas of the image.

For example, discrimination might be based on rate of apparent motion. For actor inputs delivered by a user to a wearable device that captures the inputs using an imaging sensor, inputs from the user may be expected to be relatively close to the user, and thus close to the sensor. That is, a hand gesture will be within arm's reach, typically on the order of a meter, of a user's body and thus will likewise be within arm's reach of the wearable device. It will be understood that apparent motion is in part a function of distance from the point of view, i.e. for two objects moving at equal speeds the closer object will have a greater apparent motion. Thus, hand gestures may be expected to have relatively high apparent motions compared to more distant background objects.

In such an arrangement, portions of an image or field of view might be excluded from efforts to identify a hand or other actor if those portions have an apparent motion of less than some minimum value. Thus, distant moving objects and/or stationary objects may be excluded from consideration when evaluating an image to identify an actor input.

The preceding approaches for reducing data processing are examples only. Other approaches for reducing data processing may be equally suitable.

Figure 21:
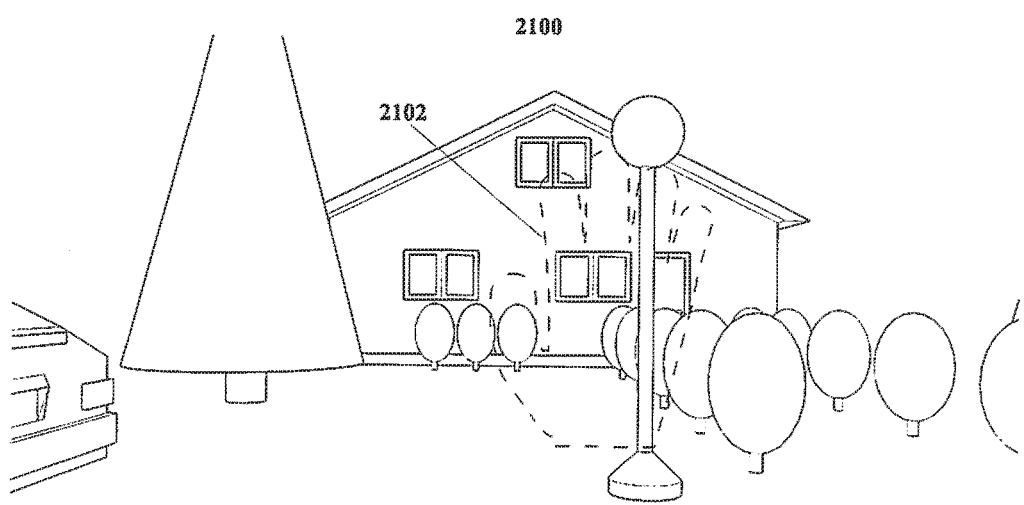
FIG. 21 shows another region in accordance with the present disclosure, defined substantially in the shape of a hand.

Referring now to FIG. 21, a field of view of an environment 2100 is shown therein. A substantially two dimensional region 2102 is defined in space. As shown, the region 2012 is substantially in the shape of a human hand extended palm-forward with fingers slightly spread.

Figure 22:
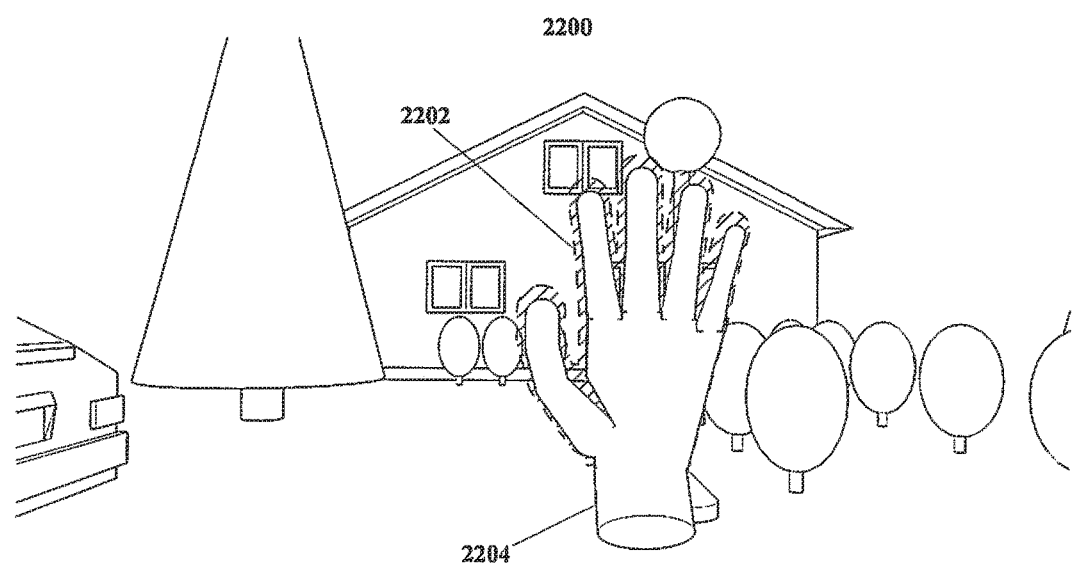
FIG. 22 shows a region in accordance with the present disclosure, with a hand disposed therein.

Similarly, with reference to FIG. 22, a field of view of an environment 2200 also is shown therein, again with a substantially two dimensional region 2202 defined in space substantially in the shape of a human hand extended palm-forward with fingers slightly spread. In addition, FIG. 22 also shows a hand 2204 extended palm-forward with fingers slightly spread, that is, the hand 2204 substantially matches the configuration of the region 2202 as shown. Such an arrangement may be useful for certain embodiments.

For example, if the region 2202 is made visible to the user, e.g. as outputted via a display, the similarity in shape between the region 2202 and a user's hand 2204 may suggest to a user that he or she should place a hand 2204 within the region 2202 in the posture shown. Such suggestion would not necessarily require advance training, text instructions, etc., since the user may be relied upon to intuit the proper posture for their hand 2204 and the proper region 2202 in which to place their hand 2204. Use of additional images, training, text, etc. is not excluded, however.

It is noted that although FIG. 21 and FIG. 22 show regions 2102 and 2202 that are substantially two dimensional, a region 2102 and 2202 (whether hand-shaped/graphically suggestive or otherwise) is not limited only to two dimensional arrangements. For example, a three dimensional region might be used, e.g. in the shape of a hand model, a glove, etc. Such a three dimensional region could serve a similar purpose and exhibit similar advantages, e.g. suggesting to a user that he or she place/align his or her hand therein. However, such an arrangement is an example only, and other arrangements may be equally suitable.

In addition, an arrangement such as shown in FIG. 21 and FIG. 22 is illustrative of another possible feature of the present disclosure. With reference specifically to FIG. 22, consider an arrangement wherein a user places a hand 2204 within a region 2202 defined to substantially match an outline of the hand 2204 in a particular posture as illustrated. For a hand 2204 in the region 2202, the outline of the hand 2204 will correspond approximately with the outline of the region 2202.

It is noted that the region 2202 is defined as part of a method according to the present disclosure (as described elsewhere herein). Thus, it will be understood that the edges of the region 2202 are similarly defined, i.e. defining the region 2202 implies defining the edges of the region 2202 (or other functionally similar boundaries, e.g. a surface for a three dimensional region, etc.).

In so defining a region with the expectation that a user's hand will be disposed therein, a preliminary data set is being defined. That is to say, preliminary salient features and/or a preliminary model are defined in advance of the hand 2204 being placed in the region 2202, such that the edges of the region 2202 correspond with the anticipated edges of the hand 2204 when the hand 2204 will be placed within the region 2202.

As previously described herein, salient features and/or a model that are initially unknown can be derived from an actor such as a hand. As also previously described, salient features and/or a model that are already known can be used to detect, define, identify, etc. a hand or other actor.

Since salient features and/or a model can be determined from an actor, and salient features and/or a model can be used to identify an actor, it follows that one data set of known salient features and/or model can be used (perhaps indirectly) to determine a different data set of salient features and/or develop a different model based thereon.

Such an arrangement is useful for at least embodiments of the present disclosure. However, some preliminary explanation may be illuminating in regards to this matter.

In the abstract, one data set of salient features and/or model may be equally as valid as another data set of salient features and/or model. That is, so long as a particular model adequately describes a given actor, and/or corresponds with relevant salient features, the particular nature of the model and/or salient features may not be significant; any such data set could in principle be determined from an actor, and any such data set could in principle identify the actor.

In practice, however, some data sets may be more useful than others, and/or some data sets may be more readily acquired than others.

For example with regard to use, a model for an outline or other geometry of a human hand is potentially very complex. The shape of the outline of a hand may vary depending on the perspective from which that hand is viewed. Also, the shape of the outline of that hand may vary depending on the position of the individual joints. Given that a human hand has numerous joints and thus a large number of degrees of freedom in its configuration, along with a substantial range of motion for many of those joints, the outline of a human hand can vary greatly. Modeling such a large range of variation may be extremely challenging; even if a model is successfully developed, such a model may be large enough and/or complex enough as to be unwieldy, difficult to work with, slow to process, unreliable for purposes of identification, etc.

By contrast, a model for coloration of a human hand may be much simpler. While a given human hand typically has non-uniform color, for certain imaging and mathematical approaches it may be possible to characterize the overall color and/or color distribution of a given hand using a relatively simple model. For example, in some embodiments the coloring of a human hand might be modeled using numerical values and/or mathematical functions representing mean color, color variation for adjacent pixels, color variation over areas (including but not limited to color histogram probability across an image region), etc. More data-intensive arrangements such as a surface coloring map or database, while not excluded from the present disclosure, also may not be required. Simplicity and consistency in terms of a model of hand color (e.g. a few values and/or functions) may in turn be useful in identifying a hand, determining a configuration of a hand, etc.

Given the foregoing, then, a data set for hand color may be more readily useful than a data set for hand outline in identifying whether a hand is present in an image and, if so, what position that hand is in, at least for certain embodiments.

However, with regard to acquiring a data set that is not already known, determining a color-based data set for a human hand from, for example, an image, can be problematic. Typically, even if an image is known for certain to have a hand or a portion of a hand therein, identifying based on color what portion of the image is a hand may prove extremely challenging. Identifying a hand based on color may be straightforward as suggested above, but only if a model describing the color of that hand is already known. Absent a color model, determining with confidence what parts of an image are "hand" and what parts are other similarly-colored features such as tree trunks, brick, paint, vehicles, woodwork, etc. may be impractical or even impossible. The problem may be considered one of chicken-and-egg: identifying hand color may be simple, but only after hand color has been identified.

By contrast, at least for certain configurations, the outline shape of a human hand may be relatively easy to determine. While as noted above, for the general case of a hand in an arbitrary posture, in an arbitrary position, and as viewed from an arbitrary perspective the outline of a hand may be highly variable, for controlled conditions this problem may be greatly simplified. For example, given a posture with the palm facing outward and the fingers slightly spread, the shape of the outline of a human hand typically is somewhat consistent from one individual to another, such that the shape of the outline of a particular hand may be reliably predicted even without having any previous knowledge of that particular hand.

Thus, certain data sets may prove easier to obtain than others, and likewise certain data sets may prove more useful in subsequent identification than others.

In addition, as noted above one data set of known salient features and/or model can be used (perhaps indirectly) to determine a different data set of salient features and/or develop a different model based thereon. Thus, for the present disclosure it is possible to avoid the aforementioned chicken-and-egg problem with a data set that is useful and/or simple but difficult to obtain by "bootstrapping" from a data set that is readily obtained (though possibly less simple and/or useful).

Figure 23:
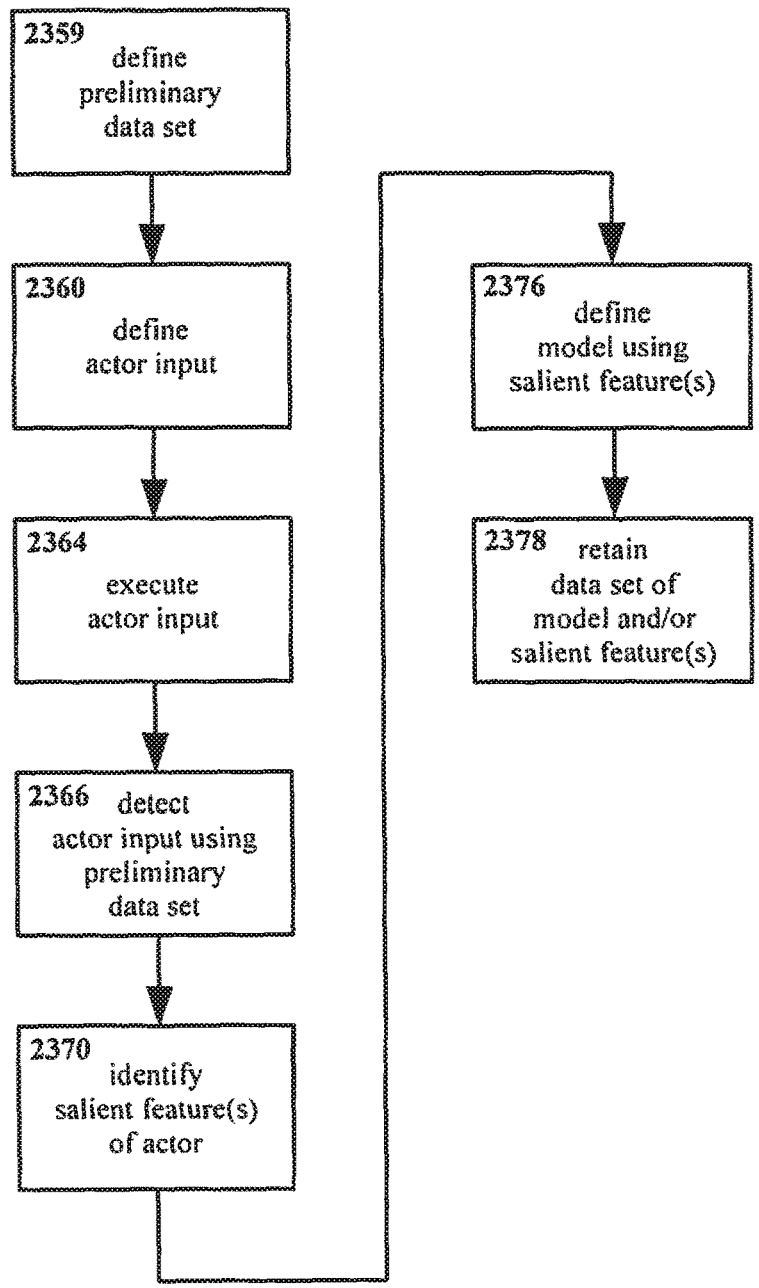
FIG. 23 shows an example embodiment of a method for interacting with an interface in accordance with the present disclosure, utilizing bootstrapping with a preliminary data set.

Referring now to FIG. 23, and keeping the preceding discussions with regard to multiple data sets in mind, an example method according to the present disclosure is shown therein wherein one data set is utilized to acquire another data set.

In the method of FIG. 23, a preliminary data set is defined 2359. The preliminary data set may include salient features of an actor, and/or a model of the actor. A preliminary data set is distinct from a data set obtained during the method (in subsequent steps described below), in that the preliminary data set is defined and/or acquired in advance of an actor input, while a ("normal") data set is determined subsequent to an initial actor input, and typically is determined at least in part from the initial actor input. However, aside from order of acquisition and/or the manner of use within the method, a preliminary data set may be (but is not required to be) otherwise similar to a data set. That is, similar salient features, similar models, etc. may be part of both a preliminary data set and a data set.

Typically, although not necessarily, a preliminary data set will be selected based at least in part on whether the preliminary data set may be defined conveniently. That is, is the preliminary data set readily assembled and/or constructed. For example, as noted above, salient features for and/or a model of a human hand in a specific posture, at a specific location, and as viewed from a specific perspective may be relatively straightforward to define (at least for certain selections regarding posture, location, and perspective).

Additionally, though again not necessarily, a preliminary data set will be selected based at least in part on whether the preliminary data set is effective in reliably identifying the anticipated actor(s) for a particular embodiment. For example, again as noted above, salient features for and/or a model of a human hand in a specific posture, at a specific location, and as viewed from a specific perspective may be sufficient to reliably identify a human hand with a high degree of confidence.

However, such a preliminary data set is an example only, and other preliminary data sets may be equally suitable. In addition, other factors, in addition to and/or in place of convenience of definition and reliability of use may be considered in defining a preliminary data set, including but not limited to efficiency/speed of actor recognition, quantity of data and/or processing requirements, compatibility with sensor capabilities, etc.

Returning to FIG. 23, the actor input is defined 2360. The actor input is also executed 2364.

Actor input is detected 2366 using the preliminary data set. For example, if as described above the preliminary data set includes salient features relating to an outline of a human hand and/or a model of the outline of a human hand, detection of whether a hand is present, is in the proper position, is viewed from the proper perspective, etc. typically would rely upon detection of the outline of a hand, based on the preliminary salient features and/or preliminary model within the preliminary data set. However, this is an example only, and other arrangements may be equally suitable.

Salient features of the actor are identified 2370. It is noted that the salient features identified in step 2370 may be, and typically (though not necessarily) are different from preliminary salient features in the preliminary data set as defined in step 2359. For example, in a particular embodiment preliminary salient features may relate to hand outline, while the salient features identified in step 2370 may relate to hand color. This is an example only, and other arrangements may be suitable.

A model is defined 2376 using the salient features identified in step 2370. As noted with regard to preliminary salient features and salient features, the model defined in step 2376 may be and typically (though not necessarily) is different from a preliminary model defined in step 2359. To continue the example above, in a particular embodiment a preliminary model may model hand outline, while a model identified in step 2370 may relate to hand color. This is an example only, and other arrangements may be suitable.

A data set including salient features identified in step 2370 and/or model defined in step 2376 is retained 2378.

Figure 24:
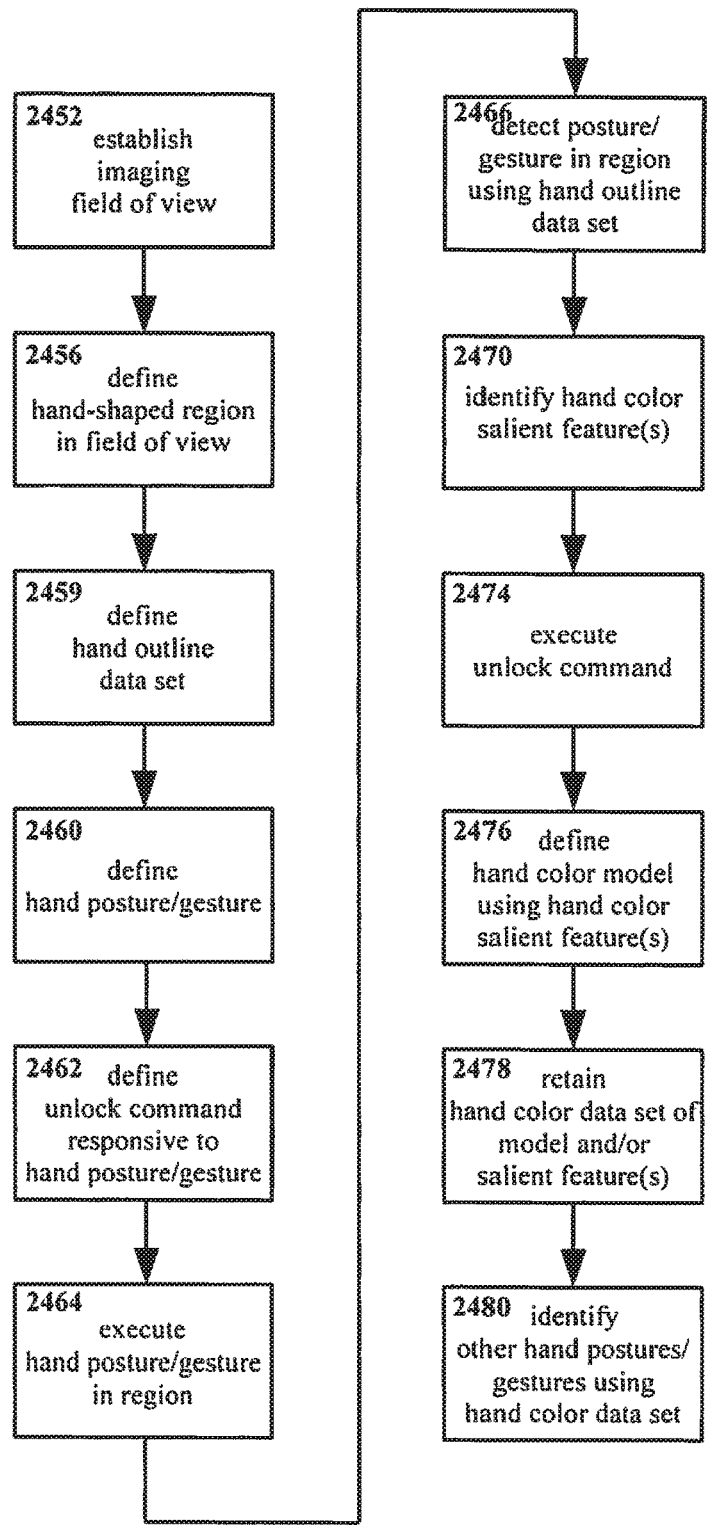
FIG. 24 shows another example of an embodiment of a method for interacting with an interface in accordance with the present disclosure, utilizing bootstrapping with a preliminary data set based on visual imaging.

Turning to FIG. 24, a method is shown that is similar to that in FIG. 23, however the method in FIG. 24 is a more detailed and specific embodiment, utilizing imaging and specific to hand outline and hand color data sets.

In the method according to FIG. 24, an imaging field is established 2452. A region is also defined 2456 within the field of view, the region being defined in a shape corresponding to the shape of a user's hand, e.g. in a specific posture, at a specific location, and viewed from a specific perspective.

A hand outline data set is defined 2459, including at least one hand outline salient feature and/or a hand outline model. For this embodiment, the specific hand outline data set typically may be defined so as to correspond with the hand posture, location, and perspective defined for the region in step 2456. As previously described, for a specific posture, position, and perspective a hand outline data set, i.e. hand outline salient features and/or a hand outline model, is relatively straightforward to define and supports reliable and high-confidence identification of a hand given that posture, position, and perspective.

A hand posture/gesture is defined 2460. For this embodiment, the specific hand posture/gesture typically may be defined so as to correspond with the hand posture, position, and perspective of the hand outline data set as defined in step 2459, and/or to correspond with the hand-shaped region defined in step 2456.

In addition, an unlock command is defined 2462 responsive to the hand posture/gesture defined in step 2460. That is, in executing the posture/gesture a command is communicated to a system, e.g. a processor controlling and/or performing the method.

The hand posture/gesture is executed 2464 within the region.

The hand posture/gesture within the region is detected 2466, utilizing the hand outline data set to detect or support detection of the hand posture/gesture. For example, it may be determined that the hand is within the region and executing the defined posture/gesture based on detection of the outline of the hand, and determining that salient features of the outline of the hand correspond to what salient outline features would be expected from an outline model of a hand.

Hand color salient features are identified 2470. That is, one or more salient features are identified regarding the color, color distribution over space and/or time, color variation over space and/or time, etc. of the hand.

The unlock command is executed 2474. That is, whatever system or function is to be unlocked as the command was defined in step 2462, that system or function is then unlocked.

A model is defined 2476 for hand color, using the hand color salient features identified in step 2470. The model describes the coloration of the hand, and as previously described may be a visual model, a mathematical model, etc.

A hand color data set is retained 2478. The hand color data set includes hand color salient features, e.g. hand color salient features identified in step 2470, and/or a hand color model, e.g. the hand color model defined in step 2476.

The hand color data set is then used to identify 2480 other hand gestures and/or hand postures.

Thus, as described generally above, and more specifically with regard to the example method shown in FIG. 24, one preliminary data set of preliminary salient features and/or preliminary model may be used to identify an actor under controlled conditions, so as to "bootstrap" acquisition/definition of another data set of salient features and/or model that may then be used for identifying the actor (or potentially other actors) under other circumstances, e.g. more general inputs under less controlled conditions.

However, the use of such a bootstrapping approach is an example only, and other arrangements may be equally suitable, including but not limited to arrangements that do not use such bootstrapping. In addition, the arrangements illustrated in FIG. 23 and FIG. 24 for bootstrapping and described with respect thereto are examples only, and where bootstrapping is used other arrangements may be equally suitable.

The above specification, examples, and data provide a complete description of the manufacture and use of the composition of the invention. Since many embodiments of the invention can be made without departing from the spirit and scope of the disclosure, the invention resides in the claims hereinafter appended.

We claim:
1. A method, comprising:
defining a preliminary geometric feature for an object;
defining a first region in a field of view of a first imaging device to identify the object, wherein the first region in the field of view is less than the full field of view of the first imaging device:
detecting, by the first imaging device, the object at a first point in time based on the preliminary geometrics feature, the object being within the first region performing a first action associated with a first instruction;
in response to detecting the first action by the object, executing the first instruction;
identifying, by a processing device, a defining feature of the object as the object performs the first action, wherein the defining feature of the object is different than the preliminary geometric feature;
generating a model of the object, wherein the model includes the defining feature of the object,
detecting, by the first imaging device, the object at a second point in time based on the model of the object, the object being within the first region performing a second action associated with a second instruction, wherein the second action is different than the first action; and
in response to detecting the second action by the object, executing the second instruction.
2. The method of claim 1 further comprising:
defining a limiting parameter for executing the first instruction or the second instruction; and
executing the first instruction or the second instruction within the liming parameter.
3. The method of claim 1, wherein:
the object comprises a human hand; and
the first action comprises at least one of a hand gesture or a hand posture.
4. The method of claim 1, further comprising:
detecting, by the first imaging device, the object at a third point in time based on the model of the object, the object being within the first region performing a third action associated with a third instruction, wherein the third action is different than the first action and the second action; and
in response to detecting the third action, executing the third instruction.

5. The method of claim 1, wherein the first region is substantially fully within the field of view.
6. The method of claim 1, wherein the object comprises an end-effector.
7. The method of claim 1, further comprising identifying a plurality of defining features of the object in the first region.
8. The method of claim 1, further comprising detecting another object using the preliminary geometric feature.
9. The method of claim 1, further comprising:
defining a second region in the field of view of the first imaging device;
detecting, by the first imaging device, the object at a third point in time based on the model, the object being within the second region performing one of the first action associated with the first instruction, the second action associated with the second instruction, or a third action associated with a third instruction; and
in response to detecting the first action, the second action, or the third action, executing the first instruction, the second action, or the third action, respectively.
10. The method of claim 1, further comprising:
defining a second region in a field of view of a second imaging device;
detecting, by the second imaging device, the object based on the model, the object being within the second region performing one of the first action associated with the first instruction, the second action associated with the second instruction, or a third action associated with a third instruction; and
in response to detecting the first action, the second action, or the third action, executing the first instruction, the second action, or the third action, respectively.
11. The method of claim 10, wherein the field of view of the first imaging device and the field of view of the second imaging device form a stereo pair.
12. The method of claim 1, wherein the first action or the second action is a substantially static posture of an end-effector.
13. The method of claim 1, wherein the first action or the second action comprises a dynamic gesture of an end-effector.
14. The method of claim 1, wherein the object comprises at least one of a hand, a finger, or a stylus.
15. The method of claim 1, further comprising outputting at least a portion of the field of view of the first imaging device to a display.
16. The method of claim 1, further comprising outputting to a display a graphic occupying at least a portion of the first region.
17. The method of claim 16, wherein the graphic comprises a virtual object.
18. The method of claim 17, wherein the graphic comprises an unlock target.
19. The method of claim 1, wherein the first region is substantially shaped as a silhouette of the object executing the first action or the second action.
20. The method of claim 1, wherein the first region is substantially shaped as an outline of a hand performing the first action or the second action.
21. The method of claim 18, wherein the graphic comprises an unlock instruction.
22. The method of claim 1, wherein the first instruction or the second instruction comprises an unlock command.
23. The method of claim 1, wherein the defining feature comprises at least one of an edge feature, a shape feature, a motion feature, a convex hull model, a concave hull feature a joint feature, a convex feature, a concave feature, a complex geometric feature, an abstract geometrics feature, or a ratio of dimension.

24. The method of claim 1, further comprising defining the first region as substantially two dimensional.

25. The method of claim 1, further comprising defining the first region as three dimensional.

26. The method of claim 1, further comprising:
defining a minimum rate of apparent motion of the object; and
in identifying the defining feature in the first region, ignoring portions of the first region exhibiting less than the minimum rate of apparent motion.

27. The method of claim 1, further comprising in identifying the defining feature in the first region, beginning at a bottom of the first region.

28. The method of claim 1, further comprising in identifying the defining feature in the first region, beginning in a horizontal stripe.

29. The method of claim 1, wherein the preliminary geometric feature comprises an outline feature of the object.

30. An apparatus, comprising:
a sensor configured to detect an object at a first point in time and a second point in time within a first region of a field of view of the sensor; and
a processing device coupled to the sensor, wherein the processing device is configured to:
determine the object is within the field of view at the first point in time based on a preliminary geometric feature of the object, the object being within the first region performing a first action is associated with a first instruction,
in response to detecting the first action by the object, execute the first instruction;
identify a defining feature of the object as the object performs the first action, wherein the defining feature of the object is different than the preliminary geometric feature;
generate a model of the object, wherein the model includes the defining feature of the object;
determine the object is within the field of view at the second point in time based on the model of the object, the object being within the first region performing a second action is associated with a second instruction; and
in response to detecting the second action by the object, execute the second instruction.

31. The apparatus of claim 30, wherein the processing device is configured to use the preliminary geometric feature to identify a second object.

32. The apparatus of claim 30, wherein the sensor is an image sensor.

33. The apparatus of claim 30, wherein the sensor is an audio sensor.

34. The apparatus of claim 30, further comprising a display coupled to the processing device, wherein:
the sensor comprises an image sensor, the image sensor adapted to obtain at an image in the field of view with the object therein; and
the display is configured to display at least a portion of the field of view.

35. The apparatus of claim 30, wherein the sensor comprising a first image sensor and a second image sensor.

36. The apparatus of claim 35, wherein the first image sensor and second image sensor are disposed in a stereo configuration.

37. The apparatus of claim 34, wherein the sensor, the processing device, and the display are disposed on a head mounted display.

38. The apparatus of claim 30, wherein the object comprises a stylus.

39. The apparatus of claim 38, wherein:
the stylus comprises at least one indicator;
the sensor is configured to sense the at least one indicator; and
the processing device is configured to identify the at least one indicator as the preliminary geometric feature.

40. A method, comprising:
defining, by a processing device, a preliminary geometric feature for an object;
defining, by the processing device, a region in a field of view of an imaging device to identify the object, wherein the region in the field of view is less than the full field of view of the imaging device;
detecting, by the imaging device, the object at a first point in time based on the preliminary geometrics feature, the object performing a first action being associated with a first instruction;
in response to detecting the first action by the object, executing the first instruction;
identifying, by the processing device, a defining feature of the object as the object performs the first action;
generating a model of the object wherein the model includes the defining feature of the object;
detecting, by the imaging device, the object performing a second action at a second point in time based on the model of the object; and
in response to detecting the second action by the object, executing a second instruction.

41. The method of claim 40, wherein the defining feature comprises at least one of an edge feature, a shape feature, a motion feature, a convex hull model, a concave hull feature a joint feature, a convex feature, a concave feature, a complex geometric feature, an abstract geometries feature, or a ratio of dimension.

* * * * *